Sept. 30, 1924.  1,510,163
R. H. ROBINSON
REENFORCED CONCRETE AND STEEL CONSTRUCTION
Filed Oct. 10, 1919   10 Sheets-Sheet 1
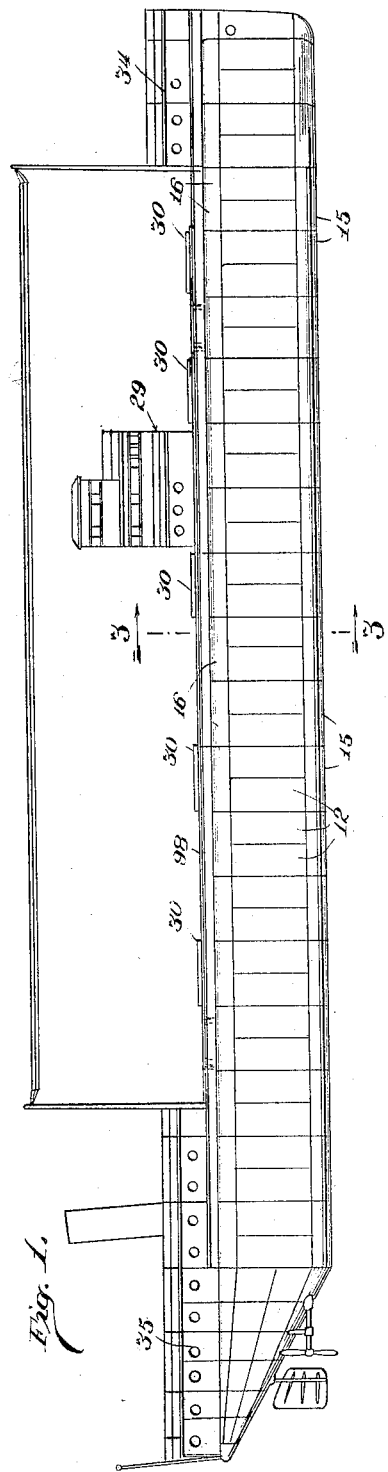
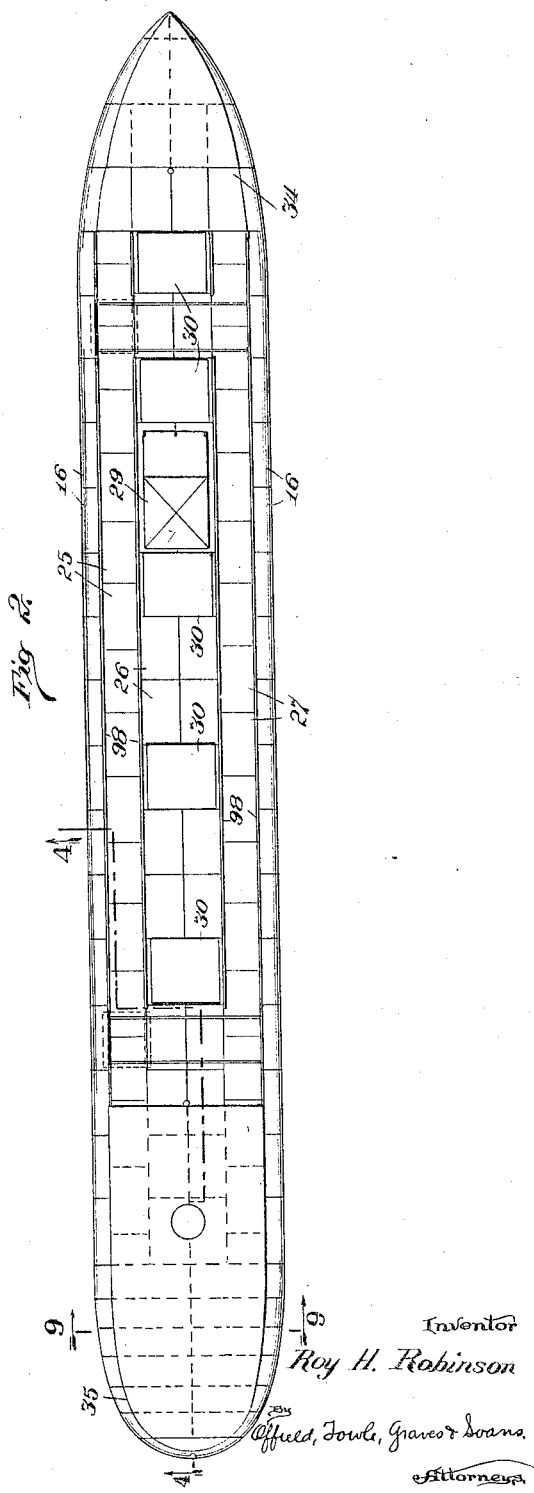
Inventor
Roy H. Robinson
Offield, Towle, Graves & Soans.
Attorneys

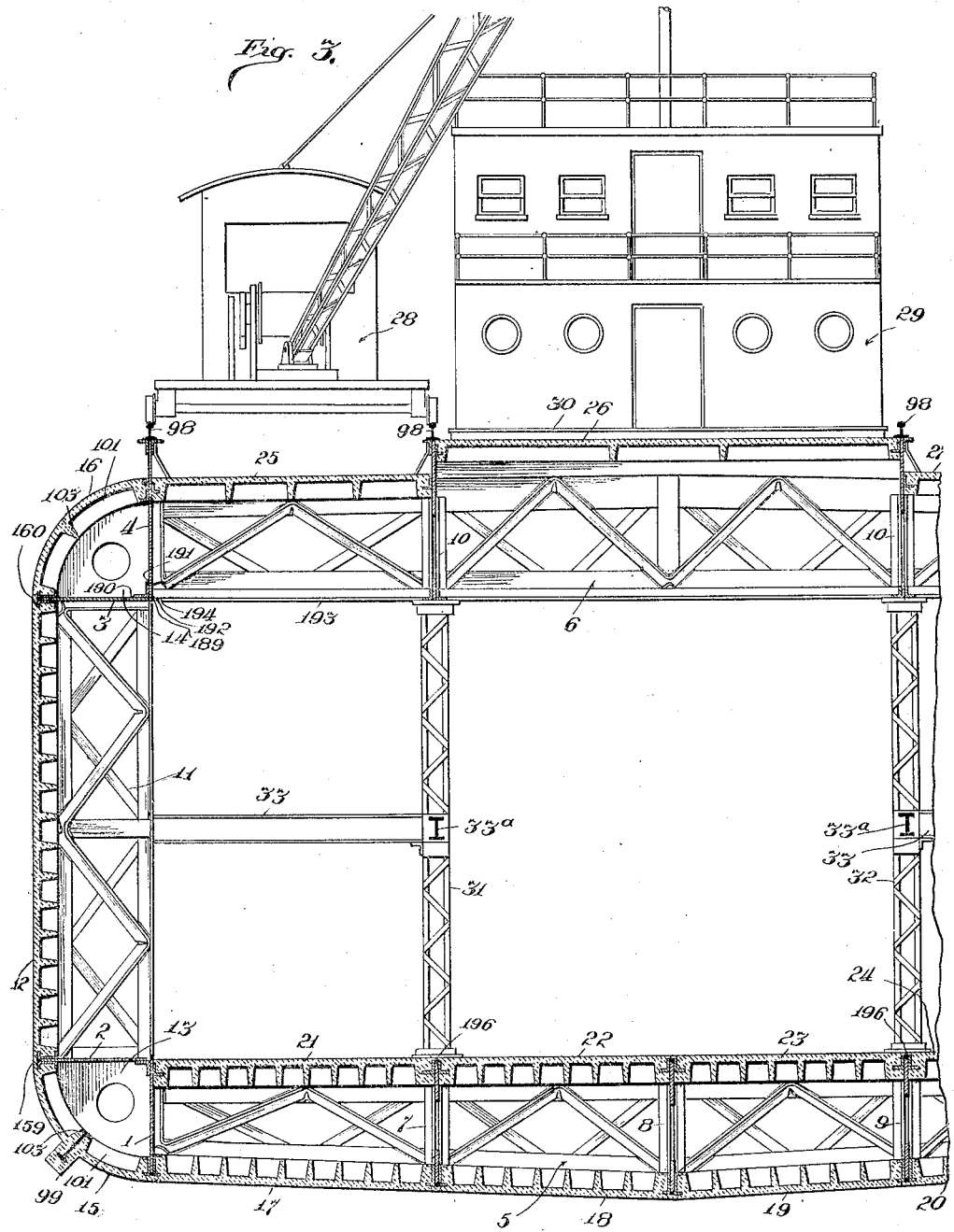

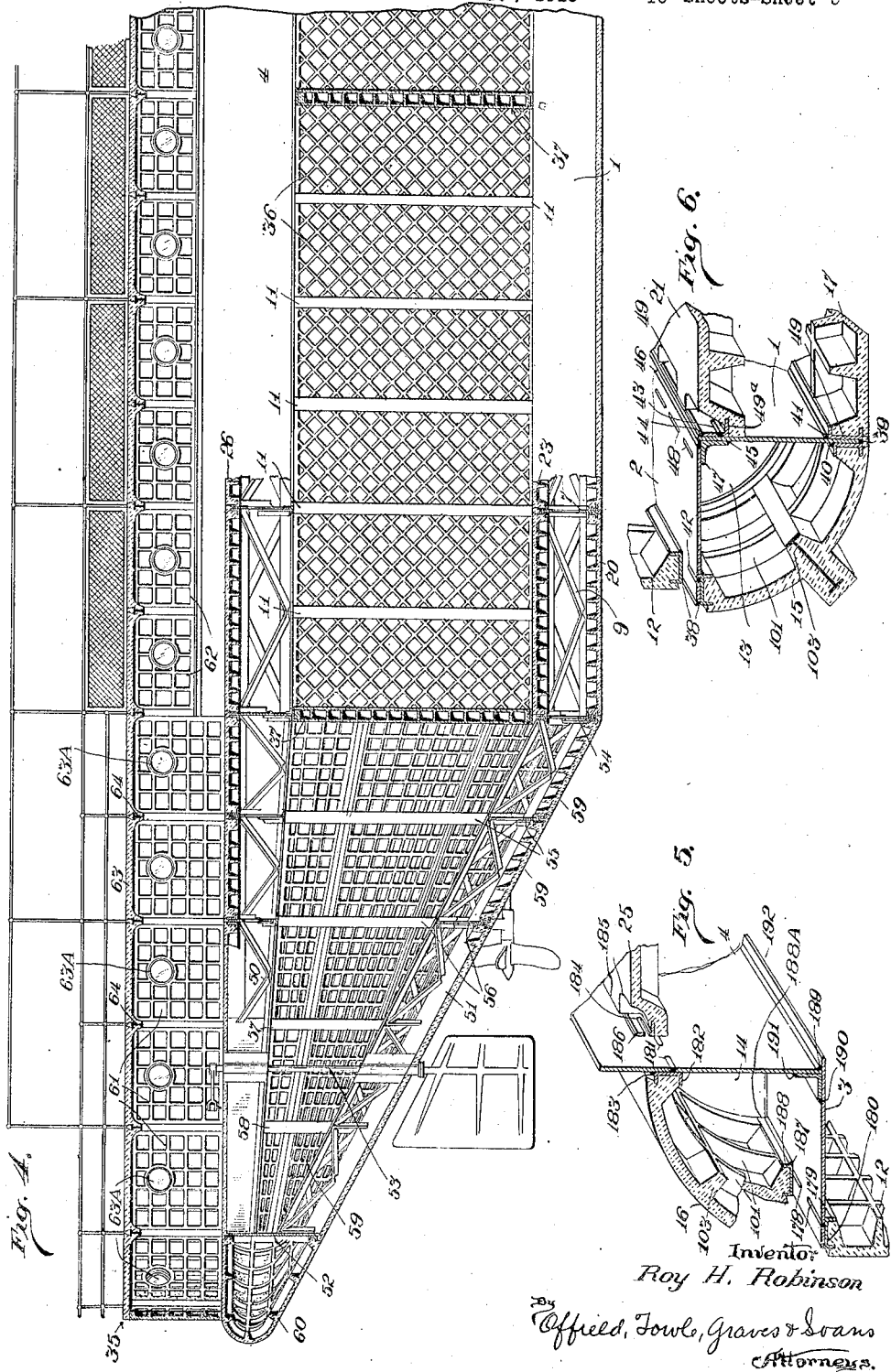

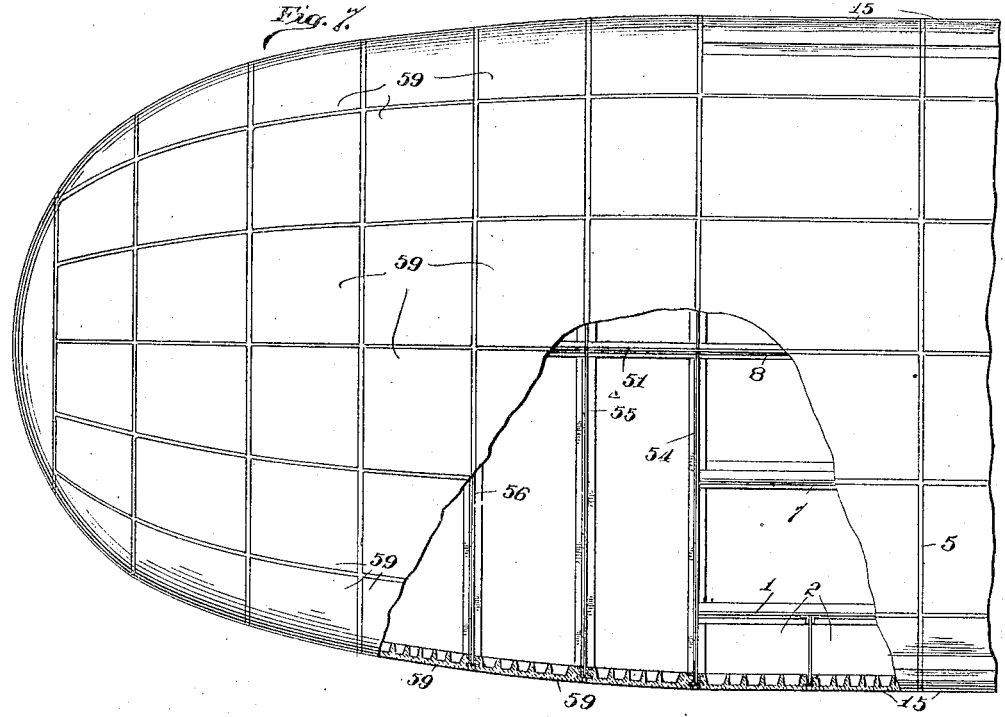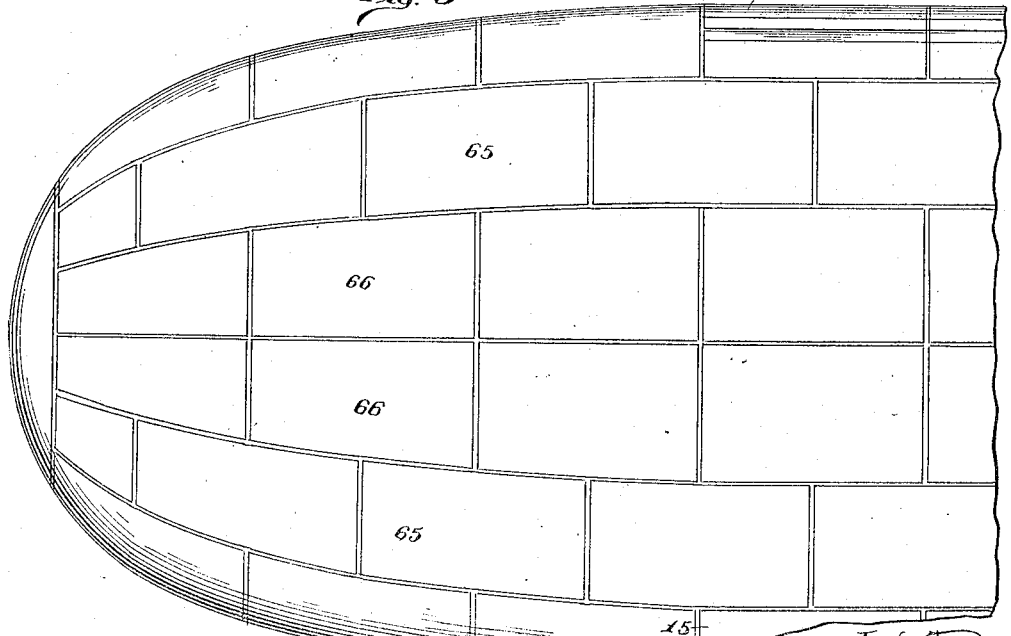

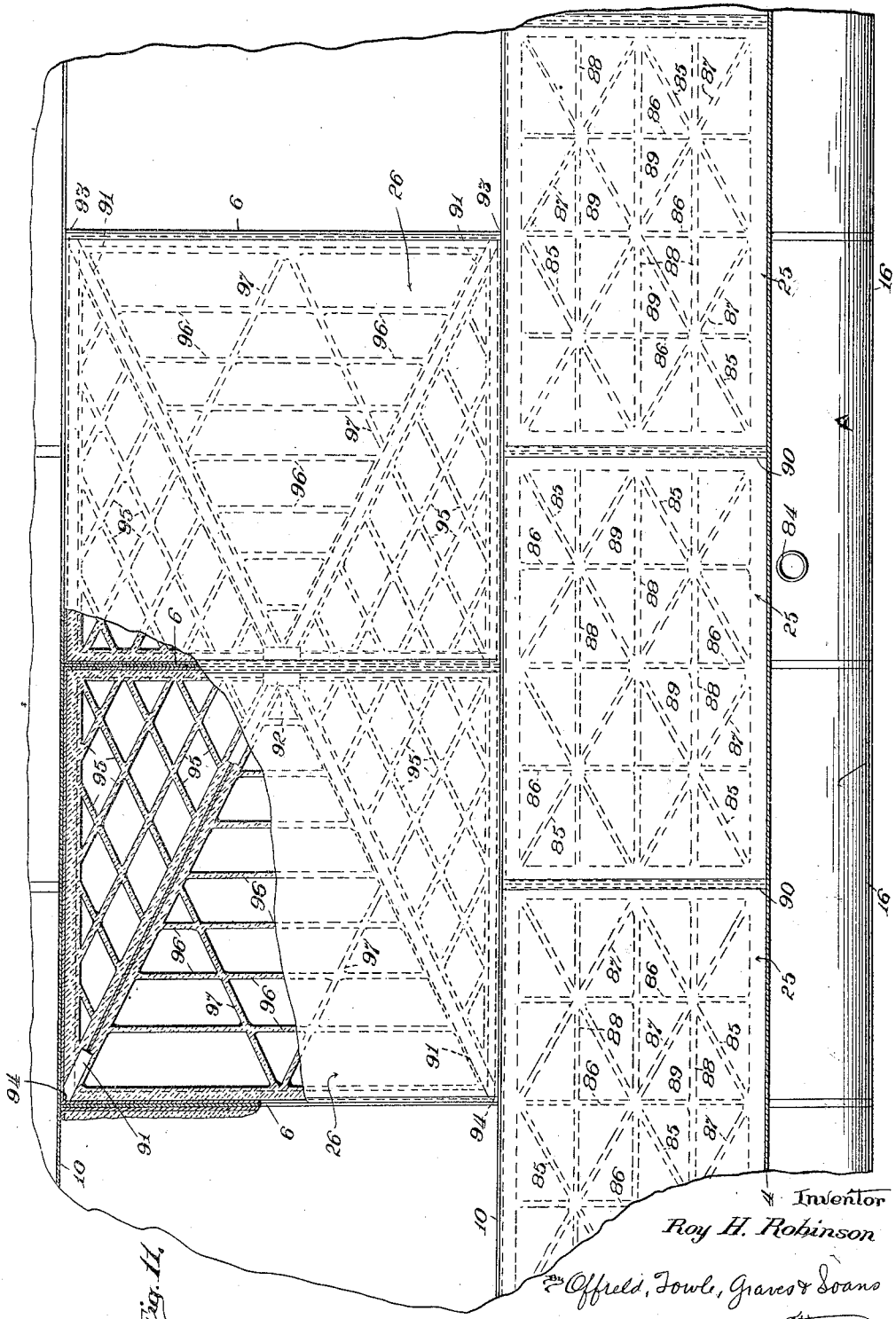

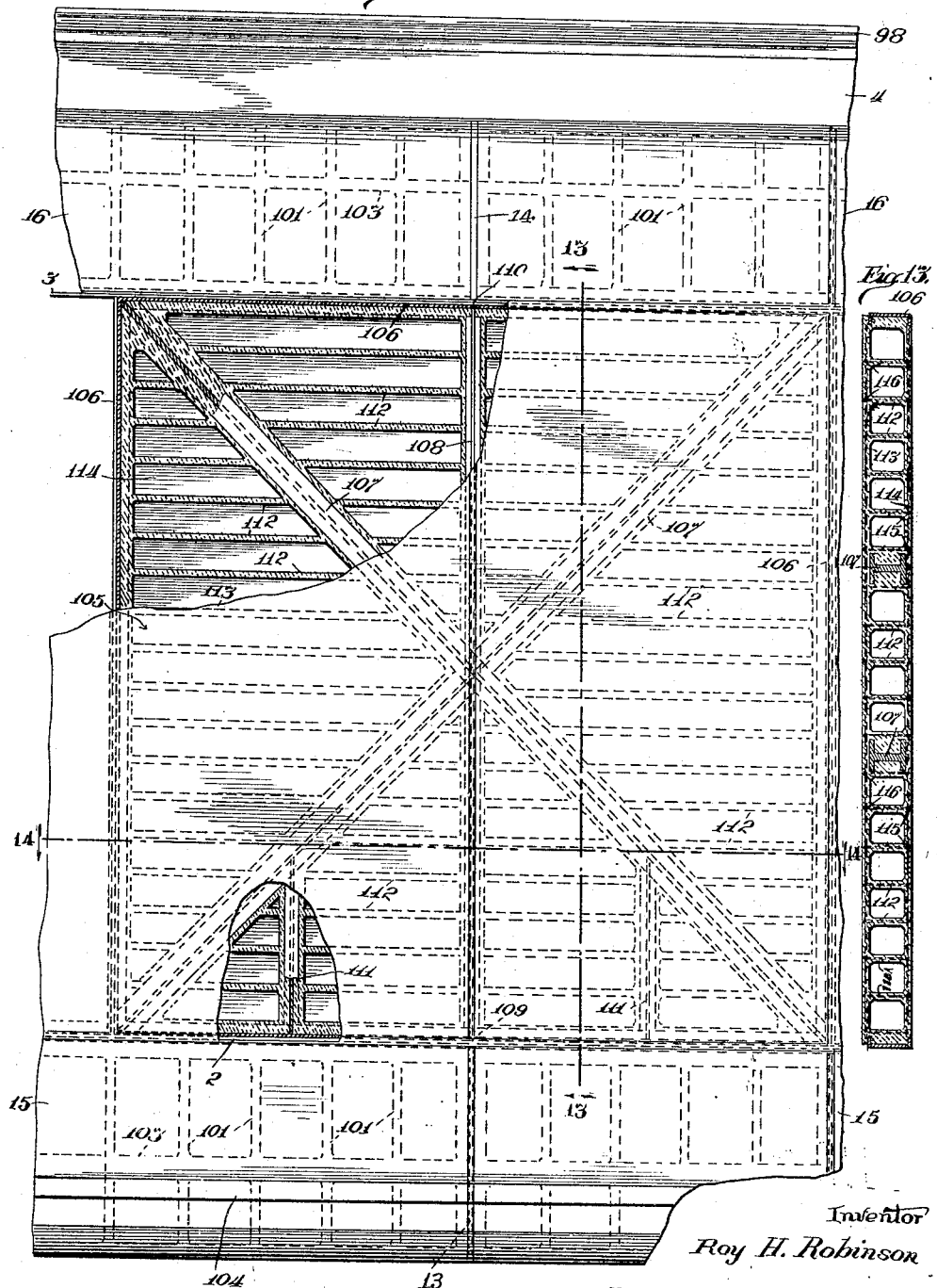

Sept. 30, 1924.
R. H. ROBINSON
REENFORCED CONCRETE AND STEEL CONSTRUCTION
Filed Oct. 10, 1919    10 Sheets-Sheet 8
1,510,163
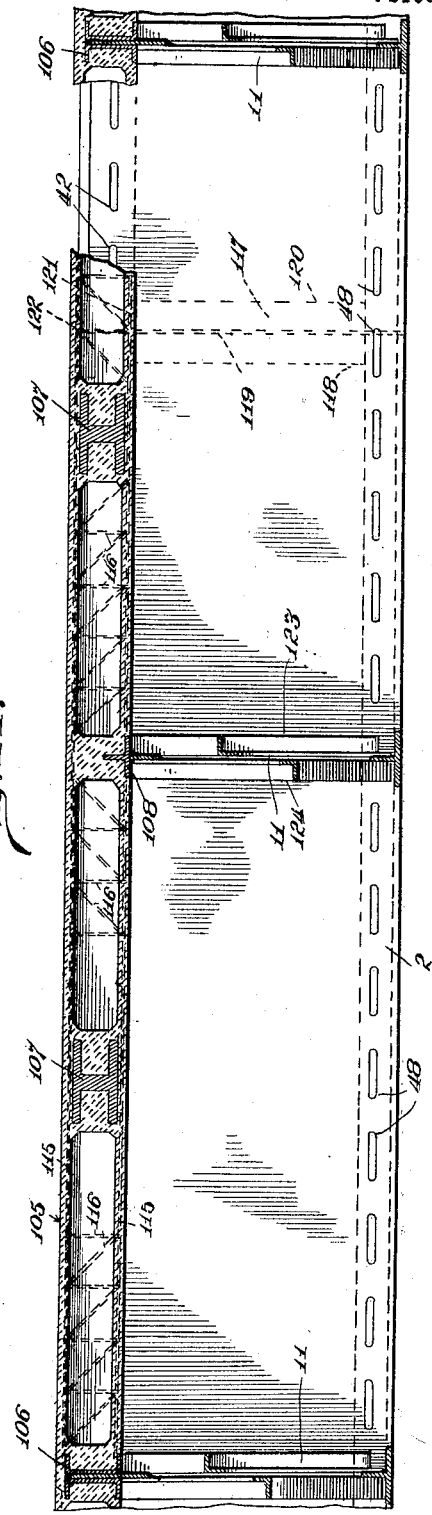
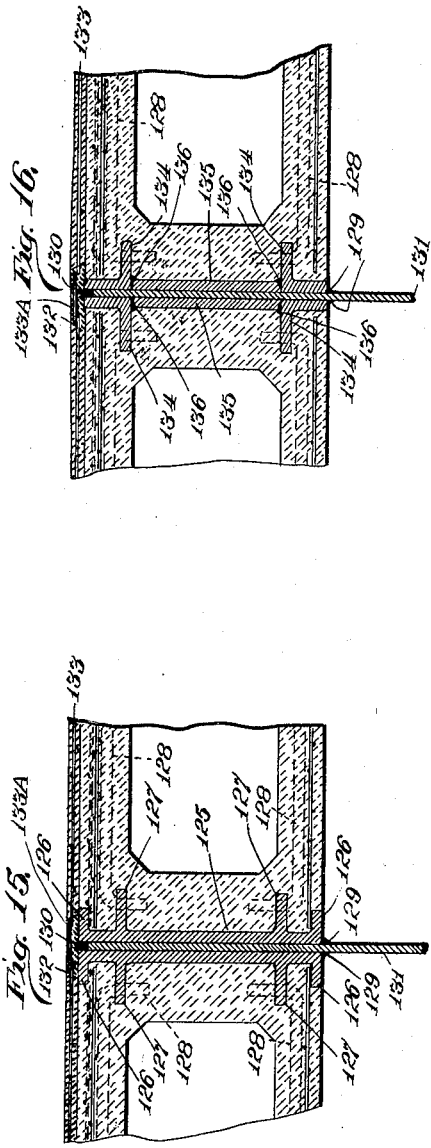
Inventor
Roy H. Robinson
By Offield, Towle, Graves & Loans
Attorneys.

Sept. 30, 1924.
R. H. ROBINSON
1,510,163
REENFORCED CONCRETE AND STEEL CONSTRUCTION
Filed Oct. 10, 1919   10 Sheets-Sheet 9
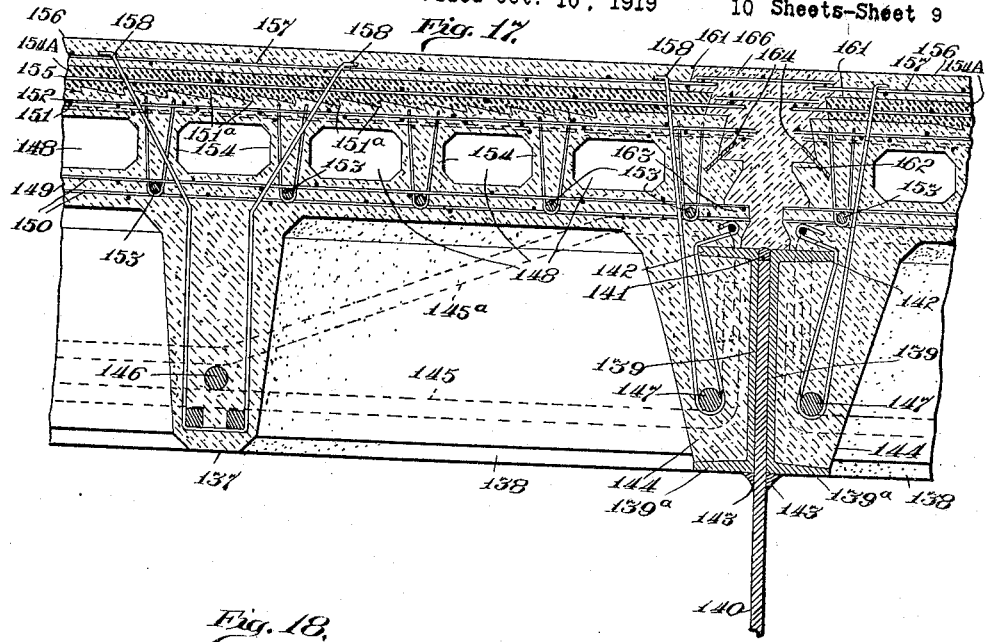
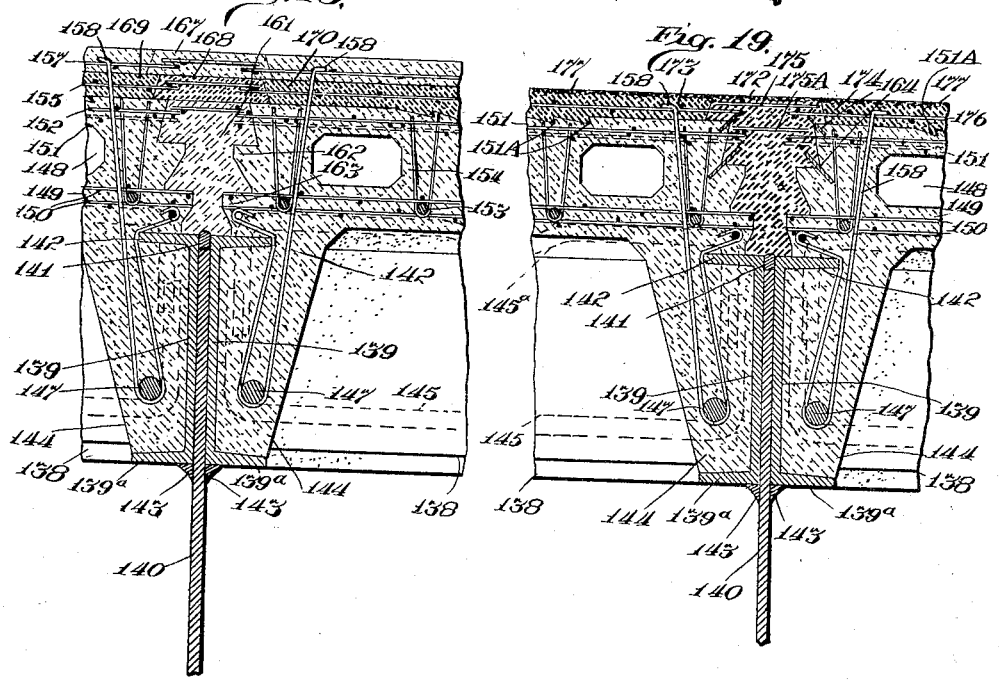
Inventor
Roy H. Robinson Sept. 30, 1924.
R. H. ROBINSON
1,510,163
REENFORCED CONCRETE AND STEEL CONSTRUCTION
Filed Oct. 10, 1919   10 Sheets-Sheet 10
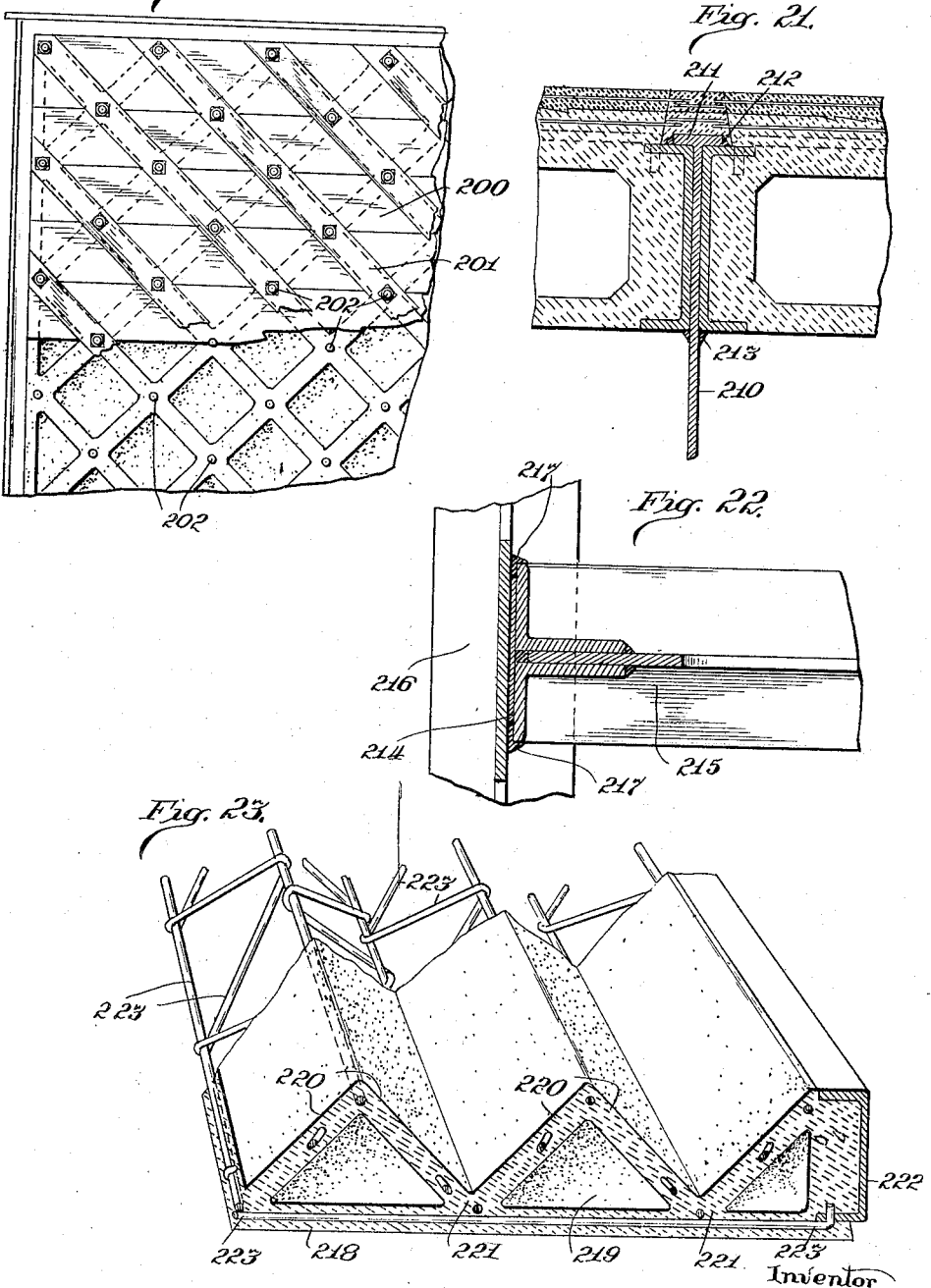
Inventor
Roy H. Robinson
By Offield, Towle, Graves & Soans
Attorneys Patented Sept. 30, 1924.

1,510,163

UNITED STATES PATENT OFFICE.

ROY H. ROBINSON, OF CHICAGO, ILLINOIS.

REENFORCED CONCRETE AND STEEL CONSTRUCTION.

Application filed October 10, 1919. Serial No. 329,834.

*To all whom it may concern:*

Be it known that I, ROY H. ROBINSON, a citizen of the United States, residing at Chicago, in the county of Cook and State of Illinois, have invented certain new and useful Improvements in Reenforced Concrete and Steel Construction.

My invention relates to improvements in the construction of concrete and steel ships including the important methods of making the same, said improvements being in part in the nature of modifications and developments in the inventions set forth in my copending serial applications No. 205,819, filed December 7th, 1917, and No. 216,873, filed February 13, 1918.

Among the principal objects of the present invention are to provide a composite concrete and steel structure which may be shop-fabricated and assembled in the field, to provide a means of constructing ships or other floating bodies by the assemblage of numerous sectional pre-cast hull shell units which can be cheaply and rapidly manufactured in quantity as a stock and continuous process, and at the same time to supply a means of so securing these together and to the frame-work of the hull as to obtain a thoroughly and permanently water-tight hull-shell with a strength and water-tightness at the points of union of the respective shell sections, at least equal to, and actually greater than that throughout the hull shell itself; to furthermore provide means for the construction of the steel frame-work of the hull and the steel frame-work of the sectional shell units so as to do away almost entirely with shop operations such as punching, bolting, and riveting, in connection with the preparation and assemblage of the steel work and hull panels; to make highly accurate connection work, otherwise required, unnecessary so that the various units of the structure built with approximate accuracy, can be quickly assembled with derricks in the field without loss of time and labor in making the parts come together with the coinciding accuracy heretofore found necessary in all assemblage work, at the cost of much time and correction of the work in the field; and generally to provide a means of rapid and economical ship construction which will produce hulls of a lightness and strength equal or superior to all-steel hulls and so minimize the labor and cost of ship building as to permit of successful American competition with the cheapest foreign building which otherwise threatens to preclude successful ship building in the United States in competition with the world market.

A further important object of the construction is to so dispose the various structural materials at such points and in such shapes, in the formation of the hull as to produce hulls of superior strength in relation to the quantities of material employed, and at the same time offer a design of hull which will provide for a novel, rapid and highly economical method of loading and unloading cargoes, this being one of the paramount considerations in the successful construction and operation of American shipping in competition with the world.

Describing generally and briefly some of the present features involved in my invention, it may be stated that the hull is constructed with a frame-work of structural steel formed in various instances into deep trusses so as to secure great strength combined with the highest degrees of lightness, and efficient use of metal, and at other points and particularly where a large amount of metal is required for the predominant and excessive longitudinal strains to which the hull is subjected, formed of steel plate girders in lieu of trusses. This steel frame-work is so designed and erected in conjunction with pre-cast shell plates of concrete or other strong cementitious material that the steel plates forming the hull frame-work come between the shell plate sections and are securely welded to them both within and without the hull. The pre-cast shell units themselves have a metal frame-work within which they are cast. This steel framing ultimately becomes a complementary and completing portion of the fabricated steel frame-work of the hull itself. This introduces a novel feature, whereby the fabrication and building up of the transverse and longitudinal steel framing of the ship hull is completed by the assemblage of the concrete shell panels in union with the hull framing.

While reenforced concrete or steel and concrete frame members can be similarly used in my construction in place of the structural steel framing without departing from the scope of my invention, it is preferred that the framing of the hull should generally be of structural steel for the reason that the frame-work is subject to reversing tensile and compression strains under the action of the sea which makes it necessary to provide in any case sufficient metal to meet both tension and compression and the addition of concrete therefore in the frame is largely an excessive weight of material not required in the framing members.

As is my previous invention I have have provided means for eliminating a large amount of transverse framing hitherto employed in concrete ship design. I have provided herein further means of lessening the weight of the hull by eliminating the number of transverse structural frames customarily employed, while at the same time securing a concrete shell of less than the customary thickness, and still providing against the shearing stresses in the side of the hull, and the heavy water pressure sustained by a large and deep draft ocean vessel.

In the design customarily employed for concrete vessels, the transverse vertical ribs of the hull are generally spaced not more than five feet apart and the shell between these supporting ribs in ocean vessels of any substantial size is not less than five or six inches in thickness. One of the main features of my invention is to reduce the number of these transverse ribs by 50% or more, spacing these on ten to twelve foot centers instead of five foot centers and at the same time making it possible to reduce the thickness of the shell itself to an inch and a half or less in thickness. To accomplish this I take part of the same amount of concrete employed in the five inch shell and distribute this in thin deep ribs generally 12 to 15 inches in depth on close centers generally 12 or 14 inches apart on the back or inner side of the hull shell. By this means, I am able to obtain a strength in these shells so extended in long spans between the hull framing which will give almost an equivalent of 10 or 12 inches of shell thickness. With the same quantity of concrete therefore, equivalent to five or six inches of solid thickness per square foot, I am able to obtain a hull shell of greatly increased strength making possible my long span system. At the same time, in order to provide against the severe strains from hogging and sagging, in the side of the hull. I dispose these deep ribs on the back of my side plates so as to run diagonally in both directions between the vertical uprights formed by the transverse hull frames. By this means I develop the full compression strength of the concrete in shear and am able to secure the necessary strength while still employing this relatively small quantity of concrete in the hull shell. This spreading apart of the transverse hull frames and reduction of the quantity and thickness of concrete in the hull envelope which I make possible by "deforming" into raised supporting parts the concrete shell plating of the hull, is a distinct innovation in concrete ship building.

A particularly novel and important feature which I have invented in my general system of concrete ship construction, centers around the peculiar use which I make of the reinforcing rods, used in the shells of all concrete vessels. It is customary to use these steel bars generally running in two directions to provide the necessary strength in the concrete shell of the hull. Hitherto, the reinforcing bars have been straight bars conformed to the shape of the hull shell and concentrically parallelling it slightly below the surface of the concrete. Under this arrangement, only a relatively small degree of strength for resisting water-pressure is developed. In my construction as quite distinct from this conventional construction, I sink each bar of the reinforcing shell, into a concrete backing rib so that they all develop a greatly increased resistance. In brief, therefore, and speaking broadly, my net-work of reinforcing bars for the hull shell is placed approximately behind the hull shell as a backing support, instead of in the hull shell. The significance of this from an engineering standpoint is readily understood.

Another fundamental advantage of this particular feature of my construction is the placing of the main reinforcing bars in the concrete of the shell panels at a relatively great depth from the outer surface of the concrete which the "deformed" back of my hull plates alone makes possible. Hitherto, in concrete ship construction, the main steel reinforcing bars of the hull shell have necessarily been placed near the surface of the concrete, the outer bars being generally within three quarters of an inch of the water. As a result of this, they are in great danger of exposure from slight cracking, disingregation or penetration of the concrete, causing the bars, thereupon, to rust and burst open the concrete shell. In my plates owing to the deep thin ribs, the reinforcing bars are for the most part carried at a considerable distance from the surface of the concrete and so are not exposed to these dangers, while the thin concrete shell itself, supported on the back ribbing is reenforced by several layers of galvanized steed mesh which not only makes cracking most difficult but also makes any erosion unlikely and of local consequence only and not affecting the major reinforcing steel upon which the strength of the vessel as a whole, as well as the hull shell seriously depends.

A further feature is to provide a protection of the shell envelope which will secure it against abrasion, puncturing, and damage from without, and at the same time make any possible cracks in the concrete shell of no consequence, because of an outer and protecting elastic envelope and cushion of a tough and enduring nature.

A further object of my invention is to secure the greatest possible efficiency of metal and longitudinal strength in the hull by preferably providing near the corners of the deck, deep longitudinal steel plate stringers or girders which pass through and above the deck throughout the greater length of the hull where the excessive hogging and sagging strains are to be met. These girders thus serve jointly as the main longitudinal framing of the hull, a bulwark for the deck on either side, and one side of the upper trimming tanks in the hull directly under the deck and still further for a rail foundation for my crane unloading provisions.

In combination with these outer bulwark girders, I similarly extend through and above the deck the adjacent inner longitudinal hull girders or stringers so that the deck and hatches between these inner girders are raised above the level of the side portions of the deck and these inner girders form the hatch-combings in this way and also provide the inner rail foundation for the cranes which travel up and down both sides of the deck. With this arrangement, I preferably omit the customary central longitudinal girder which would encumber the hatch openings, and employ the metal which would ordinarily be used for that purpose in these side girders or trusses and hatch combings on both sides of the deck. In this way, the hull is strengthened by girders of greater depth, and a greater section of metal in the longitudinal framing is brought nearer the corners of the hull so as to be of greater use in resisting the transverse strains as well.

Upon the rails, attached to these deck girders, a pair of which are thus formed on each side of the deck throughout its major length, are placed traveling and revolving whirlers, or unloading, cranes, conveyors, or other devices, which can thus move up and down the deck of the hull reaching the various cargo hatches. A special feature of my deck design to further permit of this provides for the placing of the pilot cabin and chart-house amidships between the deck crane tracks on either side so as to permit of these traveling cranes reaching all hatches fore and aft and at the same time allow the wheel house and pilot cabin to be placed amid-ship instead of at the bow and thus avoid the difficulties of rough weather. In conjunction with this arrangement, I provide cross transfer tracks preferably near or at both ends of the crane track for transferring the cranes to either side of the deck. It will be seen that by this novel means of deck design and unloading system, the present slow methods employing boom derricks are done away with. The whirler, by taking the desired position can unload any hatch without raising or lowering its boom and by merely whirling with its load. At the same time being located near the outer edge of the deck, its boom can reach over a much larger radius on the dock or unloading place so as to give a much greater field of operation. The whirler can, furthermore, operate several times as fast as the boom derricks hitherto employed.

A novel feature of my invention is the uniting of pre-cast concrete plates by welding them together through a medium of integral metallic plates or members provided for that purpose; and in this connection a still further feature is the securing of such a union of the adjacent pre-cast ship plates and the hull frame-work by a single weld which unites all three parts at one and the same time and also completely seals the hull from the entrance of water.

A further novel feature is to provide for welding openings in the concrete, in the assemblage of pre-cast concrete units, so that the metallic uniting parts, to be welded, can be reached by an electrode and welded, and thereafter, the weld covered and completely protected by a final application of concrete.

Referring further and more particularly to the pre-cast concrete plate construction of my hull, I provide several types of pre-cast plates, all of which are provided with exposed metallic welding elements at or near the edges of the plates, which are to be brought in contact with the steel frame-work of the hull when the plates are assembled in their position to form the envelope of the hull. These welding parts may be any form of metal elements, but are preferably a steel frame-work which is itself substantially imbedded in the concrete of the plate while at the same time exposing a bearing and welding face around the rim or sides of the plate. The metal so used to frame the concrete panel is made to serve several purposes; first, as a partial or complete form for the sides of the panel in concreting; second, as a substantial anchorage for the steel reinforcing which lies within the panel; third, as a seat to sustain the concrete ribs upon the back of the concrete face of the panel which forms the outer shell of the ship hull; fourth, as a portion of the calculated section of metal required in the completely fabricated steel framing of the hull to which this metal is completely and structurally united when the hull is finally assembled and sealed; fifth, as a containing templet for the quick, accurate, and economical casting of the concrete plates to the exact and required shape and size.

This metal framing is designed to provide a weld at or near the outer and also inner side of the pre-cast plates, this being an important consideration to prevent fatigue in the welding metal resulting from any rocking strains which the plate and the weld would be subjected to were the welding all in one plane. Formerly the union of preformed units has been largely affected through the medium of fresh concrete placed between or around the pre-cast elements placed in permanent position. In this practice there is not only great difficulty in making such field connections but an element of uncertainty as to the strength and monolithic connection of the joint when exposed to the rack and strain to which a ship hull is continually exposed. To avoid this danger and weakness, instead of joining my pre-cast elements through the attempt to secure a monolithic union of the concrete, I join the pre-cast units through a "monoferric" as distinguished from a monolithic union of the structure thereby securing a thoroughly dependable connection and by running this continuously about the joints of the pre-cast plates, at least on the outer side of the connection, the previously existing joints are entirely eliminated by the melting and fusing together of the steel. In making this melted or welded connection in uniting the plates and the frame-work of the hull, I set the steel hull frame-plates coming between the adjacent pre-cast plates, slightly within the outer edges of the adjoining plates so as to leave a recess or pocket to hold the welding metal. By filling this pocket, in welding, I thus am able to unite the three parts, i. e. the two metal faces of the adjacent precast plates and the hull frame with but one weld. This is an important feature of my construction in the matter of economy as well as in strength. In conjunction with this outer weld, I then weld the inner edge of the panel frames to the steel frame-work of the hull on the inner side of the hull, thus preventing any racking or rocking tendencies which might tend to weaken or injure the main outer weld. The inner weld is preferable as a matter of economy only "spotted" or "tacked" at intervals. With this, the point of union will be found stronger than any other point of the hull envelope. If, however, it is desired to make the hull joints water-tight both from within and without, and still further reenforced, the inner weld can also be run continuously around the edge of the panel making a continuous welded union of the metal on the inside as well as on the outside of the hull.

In view of my deforming the back of my concrete ship plates with raised ribs on close centers, the outer shell sustained by this network of small reenforced concrete beams is abnormally strong in resisting puncturing and crushing in from blows or collisions. The shell itself spans only a few inches between this ribbing and a blow is thus sustained by the ribs which are distributed over the entire area of the plate and which have exceptional strength because of their relatively great depth.

Where it is desired, however, to provide still further security against the cargo space being flooded from a hole being made in the concrete shell, I provide certain modifications which entirely safe-guard against such contingencies. I construct one type of plate with the backing ribs and thin outer face, but instead of stopping the concrete at this point as is done in other instances, I lay collapsible tubular forms across the face of the fresh concrete, screeded off at this level which lies somewhat above the steel channels which I use to form the frame-work of the plate, and after placing these tubular forms properly spaced apart, I continue the concreting to a higher level above the tubes and so form a second outer shell. After the concrete has set the cellular tubes are then collapsed and removed. The outer face of the shell is reenforced with one or more layers of galvanized wire mesh, and the ribs formed between the cells are reenforced with bars and stirrups which are placed in the customary beam formation and are further arranged to tie the outer and inner shells together. The inner shell is also reenforced with wire mesh in one or more layers, and thoroughly bonded to the rib backing by steel reinforcing stirrups or other similar anchorage imbedded in the ribs.

It is contemplated preferably to proportion the size of the cells in the additional concrete added by this outer cellular formation so that this outer section extending beyond the inner shell will displace more than its own weight in water whereby the weight carrying capacity of the ship will not be decreased by this additional protection. The only difference will then be an increase of a few inches in the outer dimensions of the hull. It is to be noted in this construction that the tubular forms can be placed and removed without interference from the steel framing of the panel. The ribbing on the inside of this plate can be run diagonally across the plate or parallel in one or both directions to the rectangular sides of the plate or in any other formation that may be desired. It is to be noted furthermore, that great strength is developed because of these outer ribs, formed by the cellular construction, lying across and being supported by the inner ribs of the plate running in the opposite direction.

As a still further modified form, I also provide a plate with an inner and outer shell and supporting ribs between. With this construction the shell can be broken into from within or without and the water still not admitted to the hull.

I build this plate preferably by laying my outer steel frame-work in the customary horizontal position upon the flat or platform surface upon which the plates are cast. To this steel frame-work are attached on both the inner and outer side, the reinforcing bars properly located to come within the concrete ribs to be formed within the plate. After the first layer of concrete for the inner shell is spread and screeded to the proper thickness within the steel panel frame, I place on this concrete, light inverted trough like forms, properly spaced apart and resting between the reinforcing bars so as to form intervening concrete ribs within the plates. The concrete is then spread over these and into the ribbed spaces between same, and over the top in a thin layer of the desired thickness reenforced with one or more layers of wire mesh. This is then screened off and finished as desired to form the outer face of the panel projected above the steel panel frame, or in certain instances flush with the top of the steel frame as explained elsewhere.

The ribs within this plate, which thus becomes cellular in form, can be run in any desired or in two directions across the plate, diagonally or parallel to the enclosing frame.

Where it is desired that the structural steel frame-work of the hull shall carry the alternately reversing shearing strains, as well as the alternately reversing longitudinal and transverse bending strain, I provide within the steel frame-work of the pre-cast plates for the sides of the hull, diagonal steel framing designed to resist the maximum shearing strains to be met in the sagging and hogging of the hull. This framing connects the opposite corners of the pre-cast plates and can be used with either the cellular ribbed plates or the plates with only backing ribs as hitherto described. When these pre-cast plates are set up and welded in place in the sides of my hull design, I thus have a structure of bridge formation in effect, composed of vertical steel struts with interposed diagonal steel bracing to resist the tensile and compression strains of shearing.

Referring further to my cellular plates, in my preferred hull design it is only necessary to use these in the sides as the corners of my hull formed as they are into trimming tanks involve no danger to the cargo or ship from the puncturing of the outer shell at this point. Where the double bottom construction of my general design is employed, it is obvious that it is not necessary to employ cellular plates in the bottom. If on the other hand, the hull is to be used for tanker services, doing away with the necessity of an inner bottom the cellular plates are then preferably used for the bottom of the hull as well as the sides and the inner bottom is eliminated.

Should it be desired for any reason to use reenforced concrete framing in place of structural steel for the structural formation of the hull, my system employed for my pre-cast concrete plates welded together is equally adaptable to the framing of the hull the same as to the panels. In such case, I pre-cast structural frame members, that is to say, beams, stringers, columns, etc., with metallic welding members embedded in the ends and sides of same and preferably forming either a portion of the concrete reinforcement required, or else the anchorage for further reinforcement imbedded in the concrete members, or both. These structural frame members are then assembled in place and welded to each other and to the hull panels, in much the same manner as hitherto described, and the welding apertures are then filled and covered over with a protective coat of concrete or other material.

In this way, the use of pre-cast concrete with its greater economy and speed of production and the great advantages of being able to manufacture it in advance, can be utilized for the structural framing while at the same time, a union of the integral parts which is thoroughly dependable and strong, and readily and quickly secured in the field, is made possible eliminating the handicap which otherwise, would make such a use and union of pre-cast framing units slow and uncertain, impractical and necessarily unpopular.

This arrangement will also permit of producing exceptionally strong framing members not obtainable by field concreting or other methods at present employed. I propose to use for such work, pre-cast moulds constructed to resist great pressure from within and to pour the concrete in these moulds after placing the reinforcement therein in such plastic condition that it can be compressed to great density and strength under pressure while the forms are agitated from without with pneumatic hammers. In this process, it is preferable to use hydraulic pressure and to apply this on the contained plastic concrete preferably along its upper surface or on as many surfaces as desired and this pressure can be maintained until the concrete has secured the desired set as may be found necessary. This process can also be applied to the pre-cast ship plates when desired.

It is to be noted that in conformity with my previous pending applications for patent I concentrate the largest possible part of the longitudinal metal of the hull at its four corners so that the same cross section of metal is made common for meeting both transverse and longitudinal strains with a maximum resistance. In this construction I use the sides of my ship as large girders with a concentration of metal at the top and bottom, their upper and lower members being connected with struts, cross ties, and web,—the shell of the hull,—in typical girder and truss formation. I use these great side girders to carry the load of the hull by spanning and supporting my cross trusses or girders for the bottom and deck of the ship between these two points instead of supporting them as in the customary ship construction upon the center keel and central longitudinal deck girder. To serve this end in my construction the cross trusses of the hull bottom and deck are preferably continuous between the side or corner girders of the hull and the intermediate longitudinal girders or trusses are made of separate sections connecting the span between the cross girders instead of vice versa as is customary in modern ship building.

In the assemblage of my hull framing and fabricated pre-cast ship plates, I so construct and place the integral members as to avoid almost wholly or in large part overhead welding which is relatively difficult and expensive and this is one of the important features of my construction.

In connection with the four longitudinal corner trimming tanks, which I enclose by the steel girders at the four corners of the hull, I provide piping connections (not shown) from the upper tanks to the diagonal opposite lower tanks and in this way permit of rapid gravity trimming of the ship. By these means when the hull is listed, the ballast of the upper deck tank on the low side of the hull by opening the valves can be transferred to the opposite bottom tank on the high side of the hull, thus quickly righting the ship.

In the rib formation of my longitudinal deck and bottom plates I preferably run my concrete ribbing in four directions that is diagonally, longitudinally, and transversely and in such formation as to form similar triangles on the back of the plate between the ribs. The purpose of this is; first, to secure through this means a maximum quantity of reinforcing metal and concrete for the longitudinal stresses of the hull; second, to provide greater resistance against torsional strains; third, to make the form work between the ribs on the back of the plates identical and interchangeable throughout the plate; fourth, to make the span of the thin shell of the plate of minimum length between the ribs.

In my construction I have devised two methods of assembling my pre-cast hull plates in union with the hull framing. In the one case sets of plates are arranged with their joints parallel and continuous with one another and thus butt against the transverse steel framing of the hull in parallel rows.

In the second case, I avoid parallel transverse joints which the first construction produces and introduce a novel feature by staggering or breaking joints so as to avoid a continuously unbroken weld running transversely around the hull.

Toward this end, I break the line of joints in alternate or double rows of plates and where the joints do not butt on the transverse hull framing, I weld the two abutting pre-cast plate ends to each other. Where these pass over the transverse hull frames, I slot the plate of the hull frame so as to let the pre-cast plate sink into same and at this point on the pre-cast plate, there is, imbedded in the concrete, a metal part which contacts with the hull frame and is welded to it on this line in assembling the hull forming a face weld instead of an abutting weld.

It is to be noted that with my corner girder construction of the hull and the spanning of the transverse trusses or girders of the bottom and deck on these side supports, intermediate, longitudinal girders and trusses in the deck can be entirely dispensed with if desired and the hatches run continuously across the deck from the corner or side girders and between the transverse deck girders or trusses so as to permit of extended hatch-openings for any type of unloading machinery such as is used on bulk ore vessels of the Great Lakes. Under this arrangement, all the longitudinal metal for the deck strengthening is concentrated in the two corner frames or tanks of the deck which are supported by the struts and deck sides. Where desired for securing greater cross section of metal or other considerations, the exterior pre-cast corner plates of the bilge and deck corners can be steel plates in lieu of concrete plates, combining with the longitudinal steel corner girders or stringers, to make steel tubular girders of great strength.

In the drawings:

Fig. 1 is a side elevation of the ship constructed according to my invention.

Fig. 2 is a plan of the ship deck.

Fig. 3 is a cross sectional view of the preferred form of hull construction, broken on section 3—3 of Fig. 1.

Fig. 4 indicates the typical construction of the hull being a cross section on line 4—4, Fig. 2.

Figs. 5–6 are cross sectional perspectives showing the welding connections and construction of the girder and pre-cast plate construction at the deck and bilge corners of the hull respectively.

Fig. 7 shows the plate construction of the bottom of the stern as viewed from below with a portion broken away to show the steel framing of transverse and longitudinal trusses to which the pre-cast plates are united.

Fig. 8 shows a modified view of the same where the transverse joints of the plates are staggered or broken instead of continuous as indicated in Fig. 7.

Figure 9:
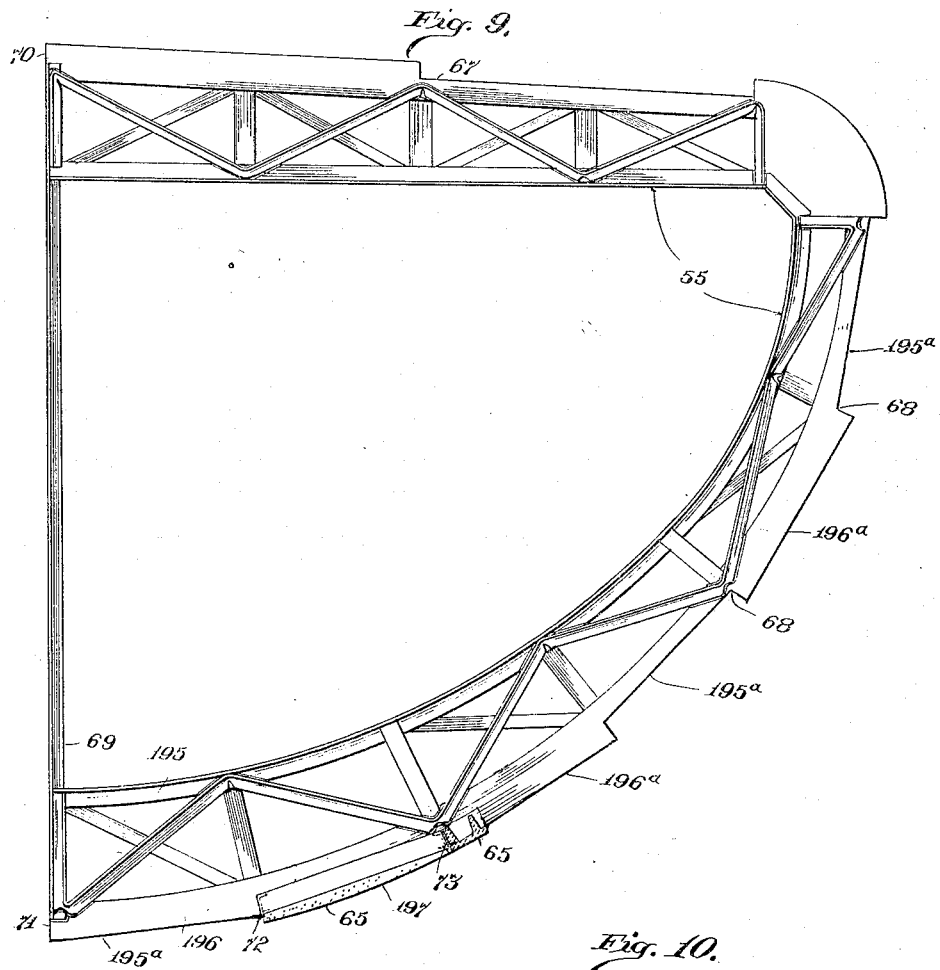

Fig. 9 is a cross section of half of the stern showing one of the transverse frames of the stern to which the plates are attached.

Figure 10:
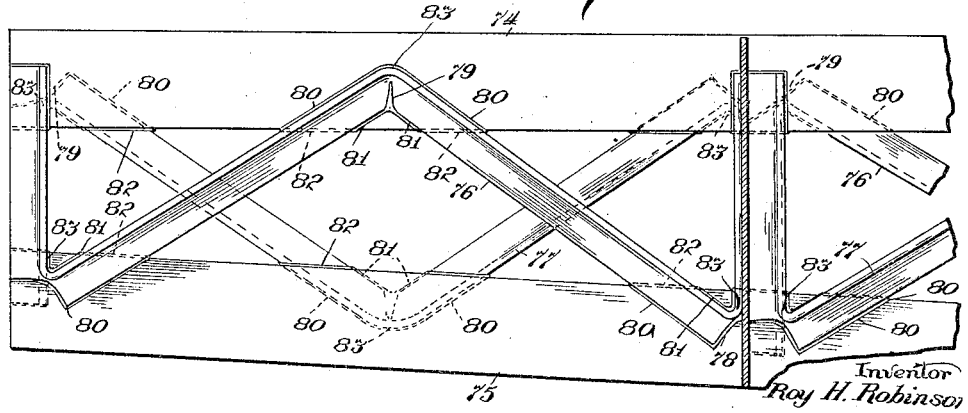

Fig. 10 shows the general form and typical portion of one of the transverse frame trusses spanning the bottom of the ship throughout the amid-ship section and indicates the general manner of welding trusses employed throughout the construction.

Fig. 11 is a plan of deck plating where the transverse joints are broken or staggered and indicates one of the several types of ribbing formation employed in the pre-cast plates. Part of this is broken away to show the underneath ribbing.

Fig. 12 is a side elevation of the hull showing a modified form of plate construction in a typical amidship section. This is broken away to show the steel diagonal framing of the plate for taking up the shearing stresses of the sides of the ship with the steel and also shows the longitudinal ribbing of the plate.

Fig. 13 shows a vertical cross section on line 13—13 through this side plate of the hull on line 13—13 Fig. 12.

Fig. 14 is a cross section through the side of the hull on line 14—14 Fig. 12 and shows the connections of the plate to the steel framing of the hull both at the ends of the plates and in the center of the plate.

Fig. 15 is a cross section of a connection of a modified form of cellular plate construction at the point of union with the steel framing of the hull.

Fig. 16 shows a cross section through a similar connection of pre-cast plates with the ship framing where angle irons with straps are used for the framing of the pre-cast plates instead of special shapes shown in Fig. 15.

Fig. 17 is a cross section through the plate connection with the steel framing of the hull showing a type of cellular formation with rib backing and an elastic slip coat on the plate foundation and an exterior concrete shell, also the concrete closure of the welding joint between the adjacent plates.

Fig. 18 shows a similar cross section where the filler over the welding joint is of concrete leveled to the surface of the broken elastic cushion coat, an elastic cushion coat being put over this joint so as to completely water-proof it and the exterior concrete shell layer being then continued by filling the joint over the elastic cushion layer with concrete.

Fig. 19 is a similar cross section of plate and union through the framing where the concrete plate is finished exteriorly with the elastic cushion covering and the aperture joint for welding, is then filled with the elastic cushion material united to the outer skin after the completion of the welding, in lieu of the cement concrete filler.

Fig. 20 is an inside plan view of one of my improved plates or panels showing the internal ribbing sheathed to form a cellular panel.

Fig. 21 is a modified form of connection between the panels and the interposed transverse frame.

Fig. 22 is a section through a modified form of main structural frame or girder and truss connection.

Fig. 23 is a fragmentary perspective view of a plate or panel embodying a triangular cell construction.

Referring to Figs. 1, 2, and 3 of the drawings, 1, 2, 3, 4 designate the longitudinal steel plate corner girders of the hull which extend from the extreme bow to the stern section of the hull and at the same time form the walls of the corner trimming tanks so obtained. Girder plate 4 passes through and above the deck so as to produce both a longitudinal girder of great strength, a bulwark for the deck, and the foundation for the crane rails 98. 5 and 6 designate respectively the transverse frames of the hull which span the breadth of the ship supported on the plate girders 1, 1, 4, 4 on either side. The longitudinal trusses 7, 8, 9, and 10 are made in sections extending between the transverse trusses 5 and 6. Between the longitudinal plate girders 2 and 3 are the vertical trusses designated 11 which secure the pre-cast side plates of the hull 12 and are in alignment that is in the same plane with the transverse trusses 5 and 6, the thrust between these being transferred by the corner tank connection plates 13 and 14. These form strengthening supports for the truss struts 11, and also form the partition walls for dividing up the trimming tanks. These plates 13 and 14 when between bulkheads have apertures in them as may be desired to permit the flow of ballast and cargo and reduce metal and weight.

15 and 16 designate the curved pre-cast corner plates which form the bilge and the deck corners of the hull and transfer the thrust of the deck, bottom and sides so as to assure great staunchness in the hull. 17, 18, 19 and 20 designate the pre-cast bottom plates of the hull; 21, 22, 23, and 24 designate the pre-cast plates of the inner bottom these being for the typical amidship section extending from near the bow to the stern section of the ship.

As noted the longitudinal trusses, 10 have steel plates forming their members which pass through the line of the deck to form the combing for the hatch and the side of the raised portion of the central part of the deck and also to provide seats for the rails 98 for the traveling unloading whirlers 28. These whirler tracks extend for and aft on the deck. The chart-house and cabin amidship 29 are designed to lie between these tracks so as to permit the whirlers to pass fore and aft reaching all the hatches, 30. The transverse girders 5 and 6 are supported and strutted apart by the columns or pillars 31 and 32 and these in turn are strutted horizontally to the vertical trusses 11 on either side by I-beams, 33 and to each other by I-beams 33$^A$.

In addition to the amidship cabin and wheel-house 29, I provide a fore-castle 34 and poop 35. These deck super-structures are also formed of light pre-cast concrete plates with metallic welding connections or frames and are welded to the steel framing of the deck on which they are erected, generally, being attached at their vertical joints to the longitudinal or transverse steel girders of the deck.

Referring to Figs. 4, 5, and 6, 36 designates the side plates of the hull with diagonal ribbing, these plates 36, spanning between the steel truss struts 11. The hull is transversely bulk-headed at 37 at regular intervals and in alignment with the transverse frames 5 and 6 with pre-cast cellular bulk-heads 37 which are also constructed with metallic frames on their vertical sides which weld to the side truss 11 and vertical steel columns or joints in alignment with columns, 31 and 32. The joints are sealed with concrete filling at the top and bottom and sides and the transverse trusses 11, 5, and if desired 6, are also concreted in at these bulk-head joints so as to make a solid partition at each side and also above and below the bulk-head plates so as to prevent the passage of water, or cargo-oil in the double bottom, from one bulk-head section to another.

In Fig. 5, 178 designates the slots punched near the outer edge of the longitudinal girder plates, 3, which permits of welding the inner edge of the channel frame 179 of the pre-cast plate 12 from above, in addition to the outside weld, 180 which completes the union at this point. Girder 4 is similarly slotted, at 181, to permit of welding the lower side of the panel framing 182 of the pre-cast corner plate, from the inner side of girder 4 in a horizontal position, avoiding over-head welds from within the trimming tanks. This with the weld, 183 which is welded from the exterior and cement filled completes the welding of girder 4 to pre-cast plate 16.

The deck plate 25 is preferably framed with an angle iron instead of a channel to permit welding from above. The angle iron is slotted near the bottom flange 184 and concrete pockets 185 are left for reaching these welding slots. The deck plates 25 are thus welded to girder 4 along the top of the angle iron at point 186 and near the lower side through slots 184 which are so arranged as to be accessible to electrodes from above. The precast, plate 16 is welded at its bottom side to girder 3 by the exterior weld 180 and on its inner side with a continuous or spotted fillet weld along the edge 187. The steel transverse reinforcing steel plates 14 are welded to the channel iron frame 188 of 16 along the edge 188$^A$ and also to girders 3 and 4 on their other two edges. Where pre-cast plate joints are staggered, these plates 14 will come between the abutting steel frame joints of the adjacent plates 16 and be welded in the manner described herein for my conventional union between pre-cast plates and the steel frames. Further intermediate plates 14 bearing against the inner side of plate 16, not at the end joints are brought in contact with metal faces imbedded in the interior face or rib of 16 at such contact points to which they are welded. The same arrangement obtains likewise with bilge corner precast plate 15.

Girder 3, Fig. 5 is extended to form an outward flange 192 on the bottom of girder plate 4, to which it is welded at points 189 in addition to the welded angle iron connection at points 190 and 191. This extending flange 192 is also made to form the support to receive the transverse girder bottom flanges 193 (Fig. 3) which are coped at the point 194 (Fig. 3) to bring the proper alignment. The end connections of the transverse girders 6 are then welded to girder plate 4.

The longitudinal girders 1 and 2 shown in Fig. 6 are welded to the pre-cast plates at their outer edges 38 and 39 and at points 40 and 41. Girders 2 are punched with a row of slots 42 and 48 which permit tack welding one side of the channel frame of pre-cast bilge plate 15 from above instead of underneath. Similarly the pre-cast inner bottom plates 21 have the angle iron frame 49$^A$ at the edge punched with a row of welding slots 43 and the pre-cast plates have apertures 49 in their upper face between the concrete ribs which permit of welding the angle iron 49$^A$ to the plates girder 1 through these with an electrode from above, dispensing with overhead welding from underneath the pre-cast plate 21. The angle iron 49ᴬ of plate 21 is also continuously welded on its edge 44 completing its connection to girder 1. Girder 1 has an angle iron 47 welded to it at its edges 45. In setting girder 1 in final position in relation to girder 2 welding slot 46 is left between the two girders as noted. This slot is then filled with welding metal which welds the girders 1 and 2 to the connecting angle iron 47 in one welding operation, with the common welding metal. Girder 2 also has a row of slots 48 punched for welding the girder to the angle iron 47 at a point near its outer edge so that by the welding of these slots, girders 1 and 2 are finally connected at two welding points 46 and 48 making a substantial solid connection. After welding apertures 43 in the inner bottom plates 21, the openings 49 are filled with concrete after the welding is completed, covering welds 43 and 44. Before the joints between the inner bottom plates are filled with concrete from above, following their welding, the steel columns 31, 32, (Fig. 3) are welded to the transverse and longitudinal truss frames at point 196 (Fig. 3) and these columns are also welded at the top to the transverse truss 6 and the longitudinal trusses 10.

The extreme stern section is framed with upper and lower continuous steel trusses or girders 50, 51, formed of steel shapes, and plates and placed on the central longitudinal axis of the hull terminating in a transom plate or frame 52. These longitudinal stern frames 50, 51 form the seat for the underhung rudder shaft 53 having the steel plates of the truss or girder curved to receive the shaft which passes through and is hung from these frames. Transverse truss frames 54, 55, 56, 57 and 58 are fabricated to be set up and welded to the longitudinal trusses, 50 and 51 and the pre-cast shell plates 59 for the stern which are cast in warped molds to the proper form and are welded to these transverse frames at both ends and to each other at their sides and to the girder 51 when adjacent to the latter. These plates 59 preferably abut so that their longitudinal edges extend in continuous longitudinal alignment. The extremity of the stern 60 is formed by a pre-cast reenforced concrete tank with steel framing and welding connection which is welded to the rear transom plate, 52. This concrete, 60 can be either in rib formation or plain without ribs. As explained the pre-cast plates 61 and 62 for the deck superstructures are cast with light steel frames or welding points and welded to the steel framing of the deck and to each other after being set in position. The light upper deck, 63, is either of similar pre-cast panel construction or can be poured in place on steel framing supports, 64, carrying the upper deck and welded to the framing of the pre-cast plates 61 and 62. The pre-cast plates 61 and 62 have cast in them supported by the backing ribs, portholes 63ᴬ so when erected the cabins are properly provided in this respect.

Referring to Figs. 7 and 8 the pre-cast shell plates 59 covering the entire hull framing as noted are laid with continuous transverse joints between the transverse stern trusses 54, 55, 56, 57 and 58 and also the typical trusses 5. In Fig. 8 the shell plates 65, 66 are staggered on the transverse joints, it being noted that where necessary to get an odd number of panels in order to break the joints uniformly on both sides of the hull, certain panels 66—66 can be paired thus obtaining the desired result.

Fig. 9 shows the truss 55 indicating the jointing scheme of the transverse stern frames. The outer steel plate of the trusses is cut away as at 67 and 68 when the pre-cast hull plates 65 are set with staggered or broken joints. This permits the plates which span intermediate transverse trusses to pass over the truss and at that point a metal face embodied in the concrete permits of welding the pre-cast plate to the truss on this contact face as at 108 Fig. 14.

Truss 55 is preferably fabricated ready to set up in one section forming a complete half section of the entire transverse truss framing. To permit of this the truss is connected with a steel vertical framing in the form of an angle iron or other suitable steel shape 69, which in turn forms a strut or column between the longitudinal frames 50 and 51 and permits of the derrick lifting and setting the complete half transverse frame 55 as a single unit. The steel strut column tie 69 when desired can be set further toward the outside of the truss. 55 is then welded to the longitudinal girders or trusses 50 and 51 at points 70 and 71. The warped plates 65, 66, or 59 are then assembled in conjunction with this transverse framing and welded to it and to themselves. The longitudinal framing in the pre-cast plates thus forms the stern structural framing in union with the transverse hull frames 54, 55, 56, etc. If any greater strength or more steel is required for extra longitudinal frames additional plates or frames can be welded in between the plates on their longitudinal joints as at points 72, 73, etc. A particular feature of my invention lies in my plan of carrying straight lines generally in my steel framing of the hull to receive the steel framing of the plates which are also carried in straight sectional lines which are interior cords on the curves of the hull, while curving the form of concrete in casting it in these straight steel frames. This is generally indicated in particular by Fig. 9 where the steeel plates or shapes 195 and 196 of the truss 55 are cut to straight cords on the outside 195$^A$ and also on the inside 196$^A$ if desired, while the concrete of the pre-cast plates 65 carries the proper curved face 197. The pre-cast plates for the curved or the stern portions of the hull are thus formed in trapezoid sections, all four straight edges of which are curved as they cut the face of the plate while the steel frame-work imbedded in these edges or sides of the plate are straight steel sections although, of course, if for any reason it is preferred, they can be bent to curves. This combination, however, of a curved surface on straight structural lines, secures a great saving of labor and fabricating work and what is known as furnace work, and bending, and makes the whole portion of the ship hull much simpler both as to hull framings and ship plates.

Fig. 10 shows the typical construction for my welded truss formation. Steel plates 74 and 75 are the upper and lower or outer members of the truss. To these I weld bent angle irons 76 and 77 in truss formation. A novel element and feature of this construction is the manner of fabricating and welding the trusses together. It is understood in calculating the design of steel trusses particularly when excessive loads which are common in ship construction are to be met, a large and sufficient quantity of rivets are found necessary at all points uniting the diagonal angle iron lacing to the outer cords of the truss. To secure this adequate number of rivets a large amount of riveting space has hitherto required wide connection plates for the angle irons to rivet to as well as additional angle iron connections riveted to the angle iron lacing at the points of riveting in order to provide sufficient riveting space. In my system of welding the angle irons to the outer cords of the truss, I avoid the necessity of these extra angle iron connections and plate connections or wider outer plate members for the connection of the cross lacing of the truss, by arranging my angle irons and their welding, so as to secure the largest possible amount of lineal welding on the angle iron, it being understood that the welded connection has a given strength per lineal inch slightly over four tons per inch as compared with about eight tons for a single 7/8th rivet.

To secure additional welding surface and at the same time a simple fabrication of the angle irons in the truss, I first slot one leg of the straight fabricated angle iron at joint 78, 79.

After these slots are punched out of the straight angle irons, the angle irons are heated and bent alternately at these slotted points to the proper diagonal lines. This can be done by bending the angle irons back and forth according to the design of the truss. These bent angle irons are then laid flat on the plates, 74, 75 on a horizontal welding platform. The truss is then welded together, by welding around the outer edge of the angle iron at 80, the inner edge 81 and the slot 79 or 78, and on the opposite or back side of the angle iron, after turning the truss over, at points 82 along the edge of plates 74 and 75.

By this means of welding the angle irons on both sides and like-wise securing a union of three parts, i. e. the sides of the severed leg of the angle iron and the plate, by the one weld at 79 or 78 and also avoiding the cutting and rewelding of the other leg of the angle iron at point 83, it is possible to secure a sufficient quantity of welding area to maintain the full strength of the connection and lessen the width of steel plates 74 and 75 on this account.

Referring to Fig. 11, 16 are the pre-cast curved corner deck-plates one of these in each group between bulk-heads has a manhole 84 cast in it, with removable cover in same to permit entering the trimming tanks for welding the inside plate joints after the pre-cast plates 16 are set in place. This also serves for entering the trimming tanks subsequently for any purpose when the ship is in service. 25, is one of the types of longitudinal deck and bottom plates which I use, a feature of which is a distribution of the concrete ribbing 85, 86, 87, 88 of the plate. It is also to be noted that the molding of these ribbed plates is simplified by the fact that the triangular shell panels 89 between the ribs are a uniform unit for all the spaces between the ribs throughout the plate. Thus in casting these, it is only necessary to have a form or flat platform and one type of cell which is attached to the platform in raised position making the cores for casting the ribbed plate as designed. In the middle rib 86, there is imbedded on the underside a T iron or other suitable steel shape with its face exposed flush with the bottom of the plate ribs. This forms the welding face for anchoring plates 25 to the transverse ribs 6, Fig. 3 which pass under the deck at this point. The ends of plates 25 meet on the lines 90, with their steel frames or faces in contact with each other at this joint and are welded to each other. If it is desired to add additional transverse strength at these joints provision can be made for metal plate or framing placed between these two abutting ends and welded to both faces of pre-cast plates and also to the longitudinal steel stringers 4 and 10 (see Figure No. 3) passing on either side.

The central plates of the deck 26 lie between the longitudinal girders 10 and have in addition to their outer framing diagonal structural steel frames 91. When these symmetrical plates are brought together end to end in reversed position so that the diagonal steel frames meet at the center 92, it is seen that the deck is reenforced by structural steel diagonal framing, transmitting the deck thrust and torsion solidly across the deck between the hatches at points 93 and 94. These plates are welded to the transverse truss 6 (see Fig. No. 3). Particular attention is given to the concrete ribbing on the back or underside of plates 26, it being noted that the pre-cast plates are so formed that when in position the ribbing between the points of the triangle 94, 92, 93 runs diagonally in both directions terminating in the diagonal structural steel ribs 91. These distribute and resist the transverse thrust coming across the deck shell and at the same time they provide the largest possible percentage of reinforcement and concrete for resisting the longitudinal strains in the hull. They also make the panels between the ribs 95 for this section of the plate identical in shape and size permitting economical forming. In the the center of the panels between the triangle steel frames 94—92—94 and 93—92—93 the ribs 96 run transversely across the plate at right angles to the axis of the ship and they are reenforced and supported by diagonal concrete ribs 97. Under this arrangement it will be seen that the spans of the concrete ribs 96 are made short and uniform while the diagonal thrusts in the deck are well provided for; the concrete shell spans are so short that a thin plate can be used; and the mould for the cells between the back ribs, as can be seen, are uniform and require only a few different sizes. When the deck plating of this design is in place, it is seen that the hull is reenforced transversely, longitudinally, and diagonally throughout, and particularly with much diagonal strength between hatches lending both great longitudinal strength to the ship with a minimum of steel and concrete employed, while at the same time giving a high torsional resistance to the deck and similarly to the bottom where a similar combination of plates 25 can be advantageously employed in lieu of rectangularly ribbed plates (21, 22, 23, 24, Figure 3).

Referring to Figs. 12, 13, 14 the longitudinal corner girder 4 are shown, projecting above the deck and hull sides. The pre-cast corner and bilge plates respectively 16, 15 abut against and weld to the transverse steel framing 13 and 14. These pre-cast corner plates have reenforced transverse concrete ribs 101 and these are further reenforced by a longitudinal concrete rib 103 in the upper plates and a similar rib in the lower or bilge corner plates extended with structural steel reinforcements to form a bilge keel 104 on the outside of the plate the sections of which are welded together at the abutting ends and the joints connected. These furnish additional longitudinal steel in the most favorable position for the longitudinal reinforcement of the ship. The large side plate of the hull 105 is a modified form of pre-cast side plate used in lieu of plates 36 of Fig. 4. The plates are generally cast approximately square, or twice the width used in the arrangement with these plates 36. In addition to the steel panel framing around their outer edge 106, plates 105 have welded within them a heavy diagonal structural steel frame 107 calculated to take up all the shear in the sides of the hull. They also have a vertical T iron 108 cast in a vertical concrete rib in the center of the plate which bears on the steel transverse vertical truss or strut 11 of Fig. 14. The steel plate edge of the vertical truss 11 in this arrangement is cut back, from the points 109 to 110 for the pre-cast concrete plate 105 to pass through. The truss between points 109 and 110 then bears on the back face of 108 and is welded to it from the point 109 and 110 in the assembling of the hull. Between pre-cast corner plates 15, 15, also 16, 16, the steel plate of the vertical truss 11 then comes between the abutting steel frames of the pre-cast plates to which it welds outside and inside.

The lower portions of plates 105 where the water-pressure in a large ship is exceptionally heavy, have the spans between the uprights reenforced by steel framing 111 embodied in the pre-cast plate, so as to shorten the span for the concrete ribs 112, in this lower section of the plate. The concrete plate within the steel frame 106 is preferably cast cellular with an outer concrete face 113 and an inner concrete face 114, and longitudinal reenforced concrete ribs 112. It is to be noted that preferably the structural steel framing 107 is narrower in width than the outer steel framing 106 to the extent that the inner reinforcing bars 115 can pass directly across the faces of the steel framing 107 and the inner concrete shell 114 maintained in full and proper thickness at this point. The reinforcing bars 115 and 116 for the ribs 112 may be straight and of uniform length for both the inner (114) and the outer (113) concrete of the pre-cast plate face and in conjunction with this reinforcing, stirrups 116$^a$ are added to develop the full beam strength of the plate ribs in resisting the water or cargo pressure from without and within, and also tie the inner and outer shells together.

In manufacturing pre-cast plate 105 the panel steel outer frame 106 is welded together and the I-beam X frame 107 is then welded within it. The bottom reinforcing bars and stirrups 116$^A$ are attached to this frame-work together with the T iron 108 and framing 111 and the wire mesh fabric for the reinforcement of the inner shell 114 is stretched over this. The steel framework is then laid flat on its inner edge on a casting platform and a thin layer of concrete screened in the frame to form the inner shell 114. Upon this fresh layer of concrete are laid light inexpensive inverted trough cell forms, the reinforcing bars with the stirrups lying between these form cells where the interior concrete ribs are to be so formed. The concrete is then poured in covering the interior forms and is brought to the proper level above the steel frames 106 where it is reenforced by the desired amount of steel mesh reinforcing preferably stretched tight and across or above the steel frame-work and the concrete is then screened to the desired thickness and given the finish preferred. It is to be noted that this type of plate can be built in series one on top of the other without the requirements of a large casting area and loss of time in waiting for the concrete plates to set thoroughly. The plates when built in layers or tiers in such construction are kept from setting up together by the customary method of white-washing the upper surface of the under-plate after casting and brief set.

Under my arrangement of the corner steel plate girder framing, 1, 2, 3, and 4 of the hull, my method of uniting the mill lengths of the steel plate to construct these longitudinal girders is a feature of the construction. This is done in conjunction with the pre-cast hull plates and is to be noted both for the strength developed and for the lack of fabricating shop work required for the steel plate and connections. These steel plates, rolled to standard mill lengths are ready for erection after they have been punched with a longitudinal row of welding slots 42 and 48 for girder 2, and slots 43, (Fig. 6) for girder 1. These plates have a butt strap 117 fillet welded on its underside at point 118 (see Fig. 14). Girder 1 is composed of plates, the ends of which are provided for in similar manner. The steel plate joints of girder plates 1 and 2 are staggered so as not to come either near each other or near the joints formed between the pre-cast plates with the transverse steel truss frames. When the girder plates are erected in place the butts are left slightly open forming the welding trough 119 between the plates and these and the under butt strap 120 are then welded to form a typical butt strap connection which runs across the steel girder plates up to the concrete plates where the inside butt straps stop at 121. From that point on the abutting girder plates are welded together and to the metal frame of the pre-cast plate on which they rest, 122. The final completion of the girder plate is then effected by bringing in place the pre-cast plate 105 and welding the inner and outer edges of its framing to the girder plates 2 across their welded connection. By this means, similarly applied for both girders 1 and girders 2 (and also for upper deck girders 3 and 4) it is to be noted that the steel framing of the pre-cast ship plates form fish-plate splices or connections across the abutting girder plates and being securely welded to the same it will be noted that the connection in these important longitudinal girders is made very effective and strong and at the same time a large amount of shop fabrication and field work avoided.

In carrying this idea further it is also possible to bring these joints of the steel plates in the longitudinal girders 1 and 2 so that they come directly under a transverse truss 11. In this arrangement, the ends of the plates can be cut with a V edge, and butted against each other to form an upper welding V. This V is then filled with the welding metal and the transverse vertical truss 11 (in the case of girder 2) is set in place to form in effect, an upper butt strap. The welding of truss 11 at the bottom edges 123 and 124, then is made to serve the double purpose of connecting truss 11 and the girders 2 and at the same time complete the welding of the abutting steel plates forming girder 2. In pursuing this plan, these and joints of girders 1 and 2, and likewise girders 3 and 4 are, staggered respectively to come in connection with different transverse trusses. In case of girder 1 the joints are made in connection with horizontal transverse trusses 5 and are similar to those formed with vertical transverse truss 11 in connection with girder 2 as described.

It is to be understood in connection with these longitudinal girders 1, 2, 3, and 4 that angle irons are welded to cross the sides of same where found necessary to give them the required stiffening other than that furnished by the transverse frames which are welded to them. Where this is done, a further feature of the steel plate butt connections is the use of this angle iron stiffener placed across the welding joint so as to serve the double purpose of both a butt strap for the end welds and the plate stiffener as well.

Referring to Figs. 15 and 16, 125 is a modified form of steel shape for the framing of the pre-cast concrete plates. These are to be used where the concrete plates within these steel frames are kept flush with the steel frame both on its inner and outer face instead of projecting beyond the steel frame. To provide most suitably for this the steel shape 125 is rolled with extending outer flanges 126 forming a shoulder to hold the concrete and further in the flanges 127 project with punched holes which secure the hooked reinforcing bars 128. The cellular formation of the plate is secured by the arrangement already described in connection with plate 105 (Figure 12). The inner and outer shell of the plates are reenforced with mesh reinforcement placed at the proper level within the concrete. After these plates are in place and welded at their inner and outer edges, 129—130 to the steel hull framing plates 131, it is necessary to protect the outer steel weld and steel members from the erosion. It is also desirable to protect the concrete against contact with sea water, abrasion, cracks, and leakage. For this purpose while the plates are in horizontal position in the factory they are given an outer layer of asphaltum mastic compound preferably similar to a mastic floor mixture formed of a combination of asphaltum and asbestos, which will adhere tenaciously to both concrete and steel, which is troweled cold on to the steel and concrete in several layers and allowed to set, it being found necessary to give this a thickness of about ⅛ of an inch. This gives a permanently elastic water-proof cushion coat on the shell of the plate which will not be affected by small cracks occurring in the concrete, will adhere firmly to both the concrete and the steel flanges, of the steel framing plate, will form a cushion to break blows upon the sides of the ship, and will insulate the hull, prevent electrolysis and will thoroughly water-proof it. If damaged in service, this cushion layer can be quickly repaired by simply troweling on more material into the injured portion of the skin, to which it homogeneously unites itself.

In order to give this outer elastic coat, greater resistance, stability and strength, I place fine meshed metal screening 133 in this outer asphaltum layer and this can, when desired, be tied with wire anchors imbedded in the face of the concrete plate. The outer surface of the concrete face can be scoriated or roughened in finish, so as to give further bond for the asphaltum covering.

In surfacing the plates in this manner the asphaltum compound is troweled over the steel flanges 126, almost to, but not to their outer edge so that the welding opening is left for reaching the welding slot 130 when the pre-cast plates are set in position ready for welding. After the welding is done, the welding opening 132 in this outer asphaltum face is then filled and troweled with additional asphaltum compound which joins in a complete and continuous impenetrable union with the older material already upon the pre-cast plates.

The reinforcing screening 133 in the outer layer is arranged to project slightly from the edges of the asphaltum covering. In completing the asphaltum joint, a strip of screening 133A is lapped over the projecting screen ends in the plates and the asphaltum compound troweled into this, sealing the joint and coating the weld. A particular feature of this is the insulating and protecting of the welded joint, thereby, against electrolysis injuring the weld or hull.

Where the expense of this asphaltum covering is not desired, the exposed steel flanges of the precast plates can be painted after welding but this is less desirable because of the lack of protection, which protection is afforded by my asphaltum coating, and likewise the necessity of repeated painting, whereas the asphaltum protection is of a permanent nature; or if desired the concrete face can be finished as the final outer surface, eliminating the mastic coating, the mastic coating being then used merely to fill the joint slots similar to 133A which would be left in the concrete at the welding joints. These slots would be filled entirely with the mastic troweled flush with the finished surface of the concrete plates or a layer of cement mortar or concrete can be first placed over the weld filling the lower portion of the slots and the mastic then placed over this, filling and smoothing over the slots and permanently protecting the welds and joints by this elastic, adhesive and permanently waterproof covering bonded to the concrete.

Where it is not desired to use a special steel shape as 125 for the concrete plate frame, I obtain corresponding results by using angle irons 134 which serve a similar purpose. These are placed with their legs projecting inwardly as noted; steel straps 135, at proper spaced apart intervals are then welded to them at points 136 so as to make a rigid framework. The remaining construction of the pre-cast plates and their assemblage and use in the hull in this design is similar to that already described for Fig. 15. This formation of framing is particularly adapted to curved work where my warped plates are to be combined to form the highly curved portions of the hull. For such work the light angle irons can be very easily bent to conform to the predetermined curves forming the four or several sides or edges of the pre-cast plates. After bending they can then be assembled and united to each other with the connection straps 135, and the inner angle 134 can be either concentric in curvature with the outer bent angle iron 134, or where preferred, to eliminate bending work, it can be straight or bent at one or more points in angles so as to form one or more cords in relation to the curves of the outer angle iron 134. This angle iron frame when assembled, preferably by welding together at the corners the members for the four or several sides of the plate, thus forms a complete templet for forming and shaping the curved concrete to be placed within it, permitting the ready production of a warped surface by screeding and troweling to these curved steel edges without the use of specially built and expensive casting moulds which would have to be built anew for every different design of hull and curves and so be impractical. This is quite important in shipbuilding as most ships are built to special order with varying sizes and curves.

It is also to be noted in this connection that the back of the curved or warped plate and particularly the concrete ribs within or on the back of the pre-cast plate, can be built on straight segment cord lines if desired, as it is unnecessary for these to conform to the exterior curved form of the plate. Thus straight interior lines as may be desired can be employed with curved exterior lines or surfaces in these pre-cast plates. Similarly the reinforcing bars in the backing ribs are preferably bent to straight or simple lines instead of two varying curves so as to make the use of straight bars or limited bending possible and standardize and simplify the fabricating so far as possible.

In this angle iron framing either one or both of the angle irons 134 can be reversed in position in relation to the straps 136 so as to have their inner projecting leg at or near the surface of the concrete so as to become the outer instead of the inner leg of the angle iron as now shown.

It is still to be understood that where it is not desired to form my steel framing of the pre-cast plate in curved sections this can be run in straight cords in relation to the exterior curves of the plates while the exterior curves are effected by the concrete alone. Similarly the steel frames of the ship structure can be bent or cut, as the case may be, to either straight cord lines or in curved lines to conform to the pre-cast plates to be assembled in or on this frame structure of the hull.

Referring to Figs. 17, 18 and 19, Nos. 137 and 138 are the concrete ribs running in two directions on the back of the pre-cast plates. The pre-cast plates are framed at their outer edges by the steel channel irons 139. When the plates are set in position to form the ship's hull, they are welded to the steel plates 140, these being the outer members of the longitudinal or transverse trusses or girders to which the pre-cast plates are united by welding. Steel plate 140, as is to be noted, is projected between the two steel channel frames 139. In this connection a special feature of my joint is the placing of this steel plate 140 so as to leave a sinkage slot 141 at its outer edge between the flanges 142 of the channels 139 and the welding of the three members 142—140—142 together by one weld in this slot and at the same time develop the continuous cross section of metal in the connection of the flanges 142 of the channel irons by this weld, and the making of a complete metallic and water-tight union of the adjacent pre-cast hull plates around their entire perimeter, through this medium. In addition to this outer welding, the securing of the pre-cast plates is completed by fillet welding 143, either tack welded or continuous which unites the inner flanges 139^A of the pre-cast frames 139 and the steel plates 140 of the hull frame-work. These inner and outer welds develop the full strength of the connection and prevent any rocking movements in the hull plates thus assembled. The steel channel frames 139 are concreted into the ribs 144 extending around the edges of the pre-cast plate forming the sides to hold and receive the thrust of the cross back ribs 137 and 138. Ribs 137—138 are reenforced with steel reinforcing rods 145—145^A—146. The upper trussed rods 145^A and 146 are hooked or anchored in holes punched in the steel flanges 142 and the straight rods 145 in the back of the ribs are hooked in the concrete and secured in place either by rods 147 or if desired by tack welding them to the steel channel frames of the pre-cast plates.

These pre-cast plates are shown with my outer cellular type of cells 148, being formed in the concrete and outer face of the plate preferably with collapsible forms which are pulled out at the sides after the concrete is set. The inner concrete shell 149 formed in this way is reenforced with the desired number of layers of reinforcing mesh 150 imbedded in the concrete. The outer concrete shell 151 is similarly reinforced with mesh 152 in one or more layers. Between the cells 148 reinforcing bars 153 with stirrups are placed in the concrete of the inner shell as noted to properly reinforce the concrete ribs 154 formed between the inner and outer concrete shells 149 and 151, and tying these shells together. The outer face of the shell 151 is scoriated with an undercutting 151^A and after this is set up, the plate is covered with an outer covering of asphaltum or bituminous concrete 155^A, preferably a mixture of light weight cellular aggregate with asphaltum compounds which is held in place and partially supported by these undercut ridges in the concrete and for this same purpose I add reinforcing mesh 155 in one or more layers imbedded in this asphaltum concrete layer and if desired preferably bonded to the concrete 151 by wire or other imbedded elements projecting into 155^A. The purpose of this layer of asphaltum concrete 155^A is to secure an elastic slip coat or layer which will not be affected by any possible cracks occurring in the body of the pre-cast concrete plate 151 and 149. It is considered possible that in the sides of a concrete ship the shearing stresses will develop small cracks in the concrete because of the reinforcing bars and concrete not working together in shear owing to their different modulus of elasticity. It is thought such cracks developing in the concrete hull sides will expose the reinforcing bars in the concrete and cause disintegration. My asphaltum concrete layer attached to the concrete plates is not affected, however, by the development of such cracks, it being permanently elastic, with the result that such possible cracks become of no consequence in their effect on the ship hull.

Over this asphaltum concrete layer, I then add an outer covering of reinforcing concrete 156, screeded on to the desired thickness and reenforced with one or more layers of galvanized steel reinforcing mesh 157, and tied to the interior of the structure of the concrete plates by the steel stirrups 158 which form the stirrups for the main reinforcement for the plate ribs 137—138. The bond between the asphaltum concrete layer and the outer cement concrete layer can be further affected if desired by imbedding gravel or other coarse particles in the surface of the asphaltum coating with sufficient projection to bond with the fresh cement concrete spread over this surface. This exterior double layer is for particular employment in the side plates of the hull where the reversed shearing stresses threaten cracks. This outer protective concrete shell 156, it will be seen, is not directly attached to the framing of the hull and is therefore not in any way stressed by the shearing movements brought to bear on the ship plates owing to the intermediate elastic asphaltum concrete which becomes a slip layer. In addition to this, the outer shell, 156 completely protects the asphaltum shell 154ᴬ from abrasion, exposure, or undue movement in position. The outer concrete shell 156 forming the sides of the hull comes flush at the surface with the top and bottom corner ship plates 15 and 16 at points 159 and 160, (Fig. 3) which themselves do not require this double exterior protection and can be provided without it. At these points of juncture, 159 and 160, the asphaltum layer 154ᴬ of (Fig. 1) can be allowed to come to the surface in these joints 159 and 160 so that the outer concrete shell 156 is kept independent of the deck and bilge plates and is in no way stressed by the shearing stresses in the hull at these points. At the same time, the outer shell 156 has its mesh reinforcements connected with the corner plates 15 and 16 so as to provide adequate stability in combination with its own ties to its own backing plate.

It is to be noted as a feature of my invention in connection with the union of adjacent pre-cast plates that the plates are so constructed at their edges as to leave a bottle-like aperture 161 at the joints to be welded which will allow access from the outside for the electrodes to reach the necessary welding joint 141. After this welding is made, the aperture 161 is then filled with protective concrete, and troweled and smoothed on the surface closing the joint.

The manner in which I step-off the sides 162 and 163 of the concrete on my pre-cast plates is to be noted, as when the plates are brought together the bottle shaped aperture 161 is formed which permits blowing a concrete filler in by the compressed air or steam method without the formation of pockets, while at the same time keying the concrete against coming out, developing a strong compression between the pre-cast plates and forming by the repeated stepping off a sinuous jointing through which it would be quite difficult for water to work its way even if there were an incomplete bond between the new and older concrete. Where it is desired to still further safeguard against any possible entrance of water in the concrete joint, I have inserted into the concrete sides of the pre-cast plates at the time of casting them, metal strips of copper or other desired noncorrosive material 164. These are imbedded continuously around the edge of the pre-cast plates, as noted, leaving a projecting tongue sticking outward at an angle so that the concrete forced into the joint will imbed itself around and thoroughly attach itself to this strip thus positively sealing the aperture against any possible entrance of water under any condition,—the purpose of this being particularly to protect the welding 141 and the steel frames 139 against any possible erosion by contact with the sea water.

In Fig. 17, it is to be noted that the concrete closure 161 when carried through to the surface between the asphaltum layers 154ᴬ of the pre-cast plates can be used to form concrete supporting bands to assist in sustaining the stability of the asphaltum concrete layers 154ᴬ which are thus confined in panels on the plates of the hull. In Fig. 18 is shown a slightly different arrangement of the joint filling where the concrete filler 161 is stopped flush with the layer of asphaltum concrete and at that point the filling of asphaltum concrete 168 is then added and continuously united with the adjoining asphaltum coverings 169 and 170 so as to make a thoroughly water-tight union with these. The exterior concrete protecting layer 167 is then added completing the joint union.

In Fig. 19, I show a filling of asphaltum concrete instead of regular concrete in the union between the concrete plates, where it is desired to water-proof and protect the interior steel by this method in lieu of the former indicated by Figs. 17 and 18. In this instance, the asphaltum concrete filler 172 is applied and united, by being heated, with the adjacent asphaltum concrete layers 173 and 174 so as to make a continuous homogeneous water-proof cushion covering on the concrete hull. The union is also reenforced with mesh 175 and 175<sup>A</sup> which is bonded with mesh 176 already embodied in the asphaltum concrete covering of the pre-cast plates, and the mesh in the concrete as indicated.

In this instance I show the pre-cast plates protected with asphaltum concrete which is troweled smooth to form the exterior of the hull. In the composition of this asphaltum concrete, I embody in its exterior surface, a copper scale 177 which is troweled into or otherwise imbedded in the surface of the asphaltum concrete, and if desired, with the addition of Portland cement for the further toughening and setting of the surface. This embodiment of copper in the asphaltum concrete serves the purpose of destroying barnacle and sea-life. When it has exhausted itself, additional copper particles can be added and imbedded or troweled into this exterior elastic coating at any time. Other mineral particles having the same effect as copper can be used in the same way in combination with the elastic concrete covering the bottom and side plates of the ship hull.

It is the purpose of the under-cut toothing 151<sup>A</sup> of my system of scoriation put on the foundation of concrete 151 to introduce a mechanical bonding support for asphaltum concrete on the sides of the hull and by being under-cut in the sinkage to similarly support the asphaltum concrete on the bottom of the ship where it is exposed to the force of gravity when not sustained by the water-pressure.

Fig. 20 is an elevation of a portion of a hull plate having sheathing on its inner wall to prevent the entry of water into the vessel in case the concrete plate is punctured. The sheathing boards are designated 200 and these are fastened to battens 201 by means of bolts 202 which are embedded in the concrete and serve to attach the battens thereto.

Fig. 21 is a sectional view of a modified form of my invention illustrating the connecting of the panel to the ship frame 210. The outer end of this frame is T-shaped as indicated at 211. The channel irons are cast in the ends of the concrete plates in the manner previously described and these irons abut opposing faces of the member 210. The parts are welded together at 212 and 213.

In Fig. 22 I show a typical section through the junction of two structural framing members such as trusses, girders and so forth, meeting at an angle for connection. The feature of this connection is the insertion of one or more inset filler plates 214 in the connection. The frame member, beam, truss, or girder 215 which frames into another member 216 is made of a length slightly shorter than the span to be filled so that it can be set in place with clearance. This being done, the filler 214 is then slipped into place so as to take up this space between connections at one or both ends of the frame element 215. The filler 214 is inset at the outer edge or edges so as to provide a welding slot between the welding edges or faces of the structural elements 215 and 216. There can be welding slots so formed on two or more sides of the frames as desired and as may be found necessary to secure the necessary cross section and length of welding area. After the filler plates are in position the slots 217 are then welded uniting the three elements 214, 215, and 216. This connection feature can be applied with equal advantage to all manner of structural framing members having welding parts which are to be connected in place.

In Fig. 23 a type of pre-cast plate is shown which provides the advantageous features of a double cellular plate without the added weight. This plate is cast with an outer steel framing 222 similar to the pre-cast plates already described, the plate having an outer concrete face 218 with inner triangular cells 219 formed by an interior face 220 of arched formation. This provides an extra strength and quantity of concrete resistance at points 221 where the plate is of single wall while at the intermediate and thinner portions of the face the cellular formation insures against injury from puncture of the outer shell. In this way a light plate of extra strength in resisting puncture is secured and the bridge formation adds greatly to the strength of the plate as a whole. The concrete cellular walls 218 and 220 are reenforced with steel reinforcement as noted which anchors to the steel framing 222 of the pre-cast plate.

Although I have described my invention, in its various aspects, in considerable detail, it will be understood that the details of construction herein described are in no sense a limitation upon the scope of the invention, which should be determined by reference to the appended claims; said claims should be construed as broadly as possible consistent with the state of the art.

The term "panel" as used in the claims means a wall element, the edges of which have substantial depth as distinguished from a mere plate or sheet of inconsiderable edge thickness compared with its area.

I claim:—

1. A vessel, the deck of which includes as framing members four longitudinal girder members extending through and above the deck, and cargo hatches interposed between the two inner girders, trimming tanks being provided outside of the outer girders and constituting the corners of the vessel.

2. A ship's hull, comprising a main skeleton frame, including a series of spaced main frame members and adjacent rows of serially connected panel members, said serial connections being staggered and located at alternate girders, the inner end edges of said panels extending inwardly beyond the girder outer edges at said connection points.

3. A ship hull having a deck structure of panel sections in odd numbers of longitudinal rows disposed between an even number of longitudinal girders so as to permit of staggered transverse joints symmetrically uniform as to both sides of the hull.

4. A ship's hull, comprising a main skeleton frame, and pre-formed panel plates united to said framing with continuous longitudinal joints and staggered transverse joints.

5. In ship construction, hull sides which include rectangular panel plates provided with diagonal ribs connecting the opposite corners of the plate.

6. In ship construction, a hull panel having diagonal ribs connecting opposite corners, and transverse ribs running longitudinally of the vessel.

7. A ship hull, comprising a series of parallel transverse trusses encircling the hull section, upper and lower longitudinal girders connected to said transverse truss members, and shell panels set between said transverse trusses.

8. A ship hull, comprising a series of parallel transverse trusses encircling the hull section, upper and lower longitudinal girders connected to said transverse truss members, and shell panels set between said transverse trusses, said shell panels having their transversely-extending joints staggered and their longitudinal joints in alignment and continuous.

9. In ship construction a curved hull comprising straight hull frames, and pre-formed plates having interior straight framing secured to the straight hull frames and provided with curved exteriors.

10. A ship's hull comprising, as frame members, top and bottom longitudinal plate girders disposed at the sides of the ship, vertical steel frames interposed between and connecting said girders, diagonal steel shearing frames disposed between said vertical and horizontal framing, and an outer concrete shell supported by said hull frame.

11. In ship construction, a hull side composed of pre-formed concrete panel members, vertical steel transverse ribs united to and disposed between said panels, said panels having diagonal backing ribs thrusting against each other and the vertical struts formed by the transverse ribs.

12. In ship building construction, the combination of a concrete shell and steel plate framing members projecting through and supporting the shell.

13. In ship construction, a hull composed of a hull frame and reenforced concrete shell panels supported thereby, said shell panels being assembled with longitudinal joints in alignment and transverse joints in broken alignment.

14. In a ship structure, pre-cast concrete panels having welding elements combined therewith, said panels being joined together and sealed outwardly by continuous welded metallic unions.

15. In a ship structure, pre-cast concrete panels having welding elements combined therewith, said panels being joined together and sealed outwardly by continuous welded metallic unions, and inwardly by tack welding.

16. A composite steel and concrete vessel, comprising a steel hull frame having substantially at the corners continuously extending longitudinal steel stringers, precast reenforced concrete panels supported by said frame and terminally connected end to end, said stringers being interposed between the panels, and panels having welding border elements welded to said stringers, the border elements of the pre-cast panels thus constituting a continuous longitudinal connection with the longitudinal steel stringers and developing the maximum longitudinal strength in the hull frame work.

17. In a composite steel and concrete vessel, the combination of a metallic frame, a reenforced concrete panel mounted in said frame, said panel being formed with internal ribbing on the back thereof, and reinforcing members in said ribbing.

18. In a composite steel and concrete vessel, a horizontally extending pre-cast reenforced concrete panel plate having an angle iron embedded therein, hull framing supporting the same, said angle iron being perforated near its lower legs and welded to said framing along its upper edge and in said perforations.

19. In ship construction, a hull comprising a hull frame, and pre-cast panel shell units united to said frame by exterior and interior welds.

20. In a ship's hull, the combination of longitudinally-extending top and bottom members having curved exteriors, and sectional pre-formed shell panels connecting said curved exteriors and forming the side walls of the hull.

21. In a ship's hull, the combination of a set of four longitudinally-extending members at the corners of the hull, curved in cross-section on their exteriors, and pre-cast composite steel and concrete panel members forming the side walls of the hull interposed between corresponding pairs of corner members.

22. In a ship's hull constructed of steel and concrete, the combination of a steel skeleton frame-work, and pre-cast reenforced concrete panel plates provided with ribs running longitudinally, diagonally, and transversely, and supported by said frame work.

23. In the hull of a ship constructed of steel and concrete, the combination of a main skeleton frame, and pre-formed reenforced concrete side plates supported by said frame and provided with vertical steel strut members and diagonal steel bracing members, said latter members being capable of sustaining the shearing stress in the hull, independently of the concrete.

24. In a composite steel and concrete vessel, a reenforced concrete hull shell provided with internally raised ribs extending between the major longitudinal and transverse framings of the hull, with reinforcing bars included and projected into the said ribs.

25. In ship construction, a hull provided with a concrete envelope, and provided with steel framing members extending through said envelope for supporting said envelope.

26. In ship construction, a hull having a concrete envelope and provided with longitudinally-extending steel framing members piercing and extending through said envelope, and anti-corrosion means covering the projecting portions of said longitudinal members.

27. In ship construction, the combination of a hull, the shell of which is constructed of separately formed reenforced concrete panel members, and a skeleton frame-work supporting said panel members, portions of said frame-work extending between said panel members and projecting outwardly thereof.

28. In ship construction, the combination of a hull, the shell of which is constructed of separately formed reenforced concrete panel members, skeleton frame-work supporting said panel members, portions of said frame-work extending between said panel members and projecting outwardly thereof, and anti-corrosion means covering the projecting parts of said frame.

29. In ship construction, a hull having a shell of reenforced concrete, said shell being formed of pre-formed plates provided with reenforced concrete diagonal backing ribs so disposed that the ends of the ribs of adjacent plates transmit the compression and tension stresses in approximate alinement 30. A ship's hull, comprising longitudinal frames and transverse frames forming a skeleton frame-work, and a reenforced concrete envelope supported by said skeleton frame-work, said envelope being provided with a grillage of reenforced concrete ribs supporting the concrete envelope between the skeleton frame parts.

31. A composite steel and concrete reenforced hull, comprising longitudinal and transverse framing members, the transverse members being spaced apart a plurality of times further apart than has heretofore been the custom in steel-framed vessels, and a concrete envelope shell extending between the transverse frames, the shell being considerably thinner than has been customary in the construction of concrete vessels of the same size and having the same span between the transverse frames, and having a grillage of thin and relatively deep internal ribbing supporting the thin shell across the spans between the transverse ribs.

32. A ship's hull, which includes adjacent pre-formed reenforced concrete structural elements and carrying welding elements, adjacent welding elements of adjacent structural members being welded to each other subsequent to assembly of the structural elements, and anti-corrosion means covering and applied to said welded unions.

33. A ship's hull, comprising a plurality of parallel structural supporting frames, and intervening reenforced concrete metal-bordered pre-formed panels attached to, and sustained along their edges by welded union with said frames.

34. A ship's hull, comprising steel frame members, and pre-cast plates having metal borders on the outer edges of said plates and flush with the outer surface of the concrete, said borders being welded to said steel frames, and an asphaltum compound covering said panels and extending over the welded connections.

ROY H. ROBINSON.